(12) United States Patent
Gyotoku

(10) Patent No.: US 8,335,399 B2
(45) Date of Patent: Dec. 18, 2012

(54) IMAGE PROCESSING APPARATUS, CONTROL METHOD THEREFOR, AND PROGRAM

(75) Inventor: Takashi Gyotoku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 575 days.

(21) Appl. No.: 12/557,410

(22) Filed: Sep. 10, 2009

(65) Prior Publication Data

US 2010/0074554 A1 Mar. 25, 2010

(30) Foreign Application Priority Data

Sep. 24, 2008 (JP) ................................. 2008-244940

(51) Int. Cl.
*G06K 9/40* (2006.01)
(52) U.S. Cl. .................. 382/275; 348/220.1; 348/222.1; 348/231.7; 348/241; 348/248
(58) Field of Classification Search ........................ None
See application file for complete search history.

(56) References Cited

U.S. PATENT DOCUMENTS

| | | | |
|---|---|---|---|
| 7,365,788 B2 | 4/2008 | Ito | |
| 2005/0074140 A1* | 4/2005 | Grasso et al. | 382/103 |
| 2007/0292126 A1* | 12/2007 | Oshima | 396/429 |
| 2008/0025650 A1* | 1/2008 | Kotani | 382/309 |
| 2008/0240608 A1* | 10/2008 | Ishii | 382/275 |

FOREIGN PATENT DOCUMENTS

| | | |
|---|---|---|
| JP | 06-105241 | 4/1994 |
| JP | 2001-223894 | 8/2001 |
| JP | 2004-242158 | 8/2004 |
| JP | 2007-006017 A | 1/2007 |
| JP | 2008-033443 A | 2/2008 |

OTHER PUBLICATIONS

The above references were cited in a Aug. 3, 2012 Japanese Office Action, a copy of which is enclosed without an English Translation, that issued in Japanese Patent Application No. 2008-244940.

* cited by examiner

*Primary Examiner* — Andrew W Johns
*Assistant Examiner* — Siamak Harandi
(74) *Attorney, Agent, or Firm* — Cowan, Liebowitz & Latman, P.C.

(57) ABSTRACT

An image processing apparatus which corrects input image data based on the image data and foreign substance information containing information on the position and size of a foreign substance includes a correction unit which corrects the influence of the shadow of the foreign substance contained in the image data, based on the image data and the foreign substance information, a still image uniformity determination unit which determines the uniformity of an image in a region around the foreign substance, a moving image uniformity determination unit which determines the uniformity of the image in the region around the foreign substance based on a determination criterion different from one applied to a still image, and a control unit which inhibits correction of the image data when the still image uniformity determination unit or moving image uniformity determination unit determines that the uniformity is less than or equal to a predetermined value.

10 Claims, 17 Drawing Sheets

| PARAMETERS | SETTINGS |
|---|---|
| APERTURE VALUE | F22 |
| ISO | 400 |
| SHUTTER SPEED | 1 / 30 |
| PHOTOMETRY MODE | AVERAGE PHOTOMETRY |
| ELECTRONIC FLASH | INHIBITED |
| EXPOSURE COMPENSATION | INHIBITED |
| AF MODE | MANUAL |

FIG. 5

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF DUST REGIONS |
| +0C | | PARAMETERS OF DUST REGION $D_1$<br>    RADIUS (2 BYTES)<br>    X-COORDINATE OF CENTER (2 BYTES)<br>    Y-COORDINATE OF CENTER (2 BYTES) |
| | | PARAMETERS OF DUST REGION $D_2$ |
| | | . . . |
| | | PARAMETERS OF DUST REGION $D_n$ |

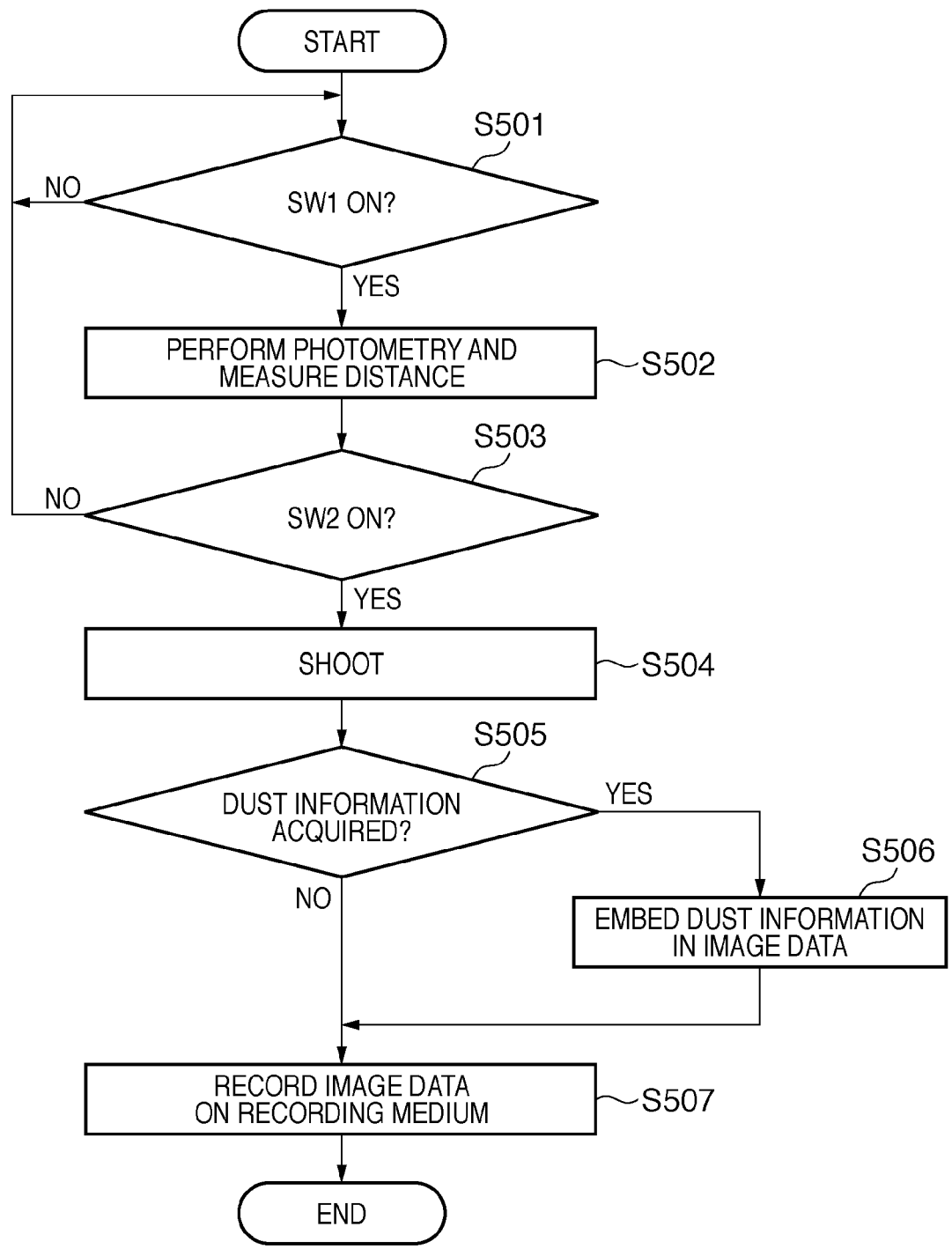

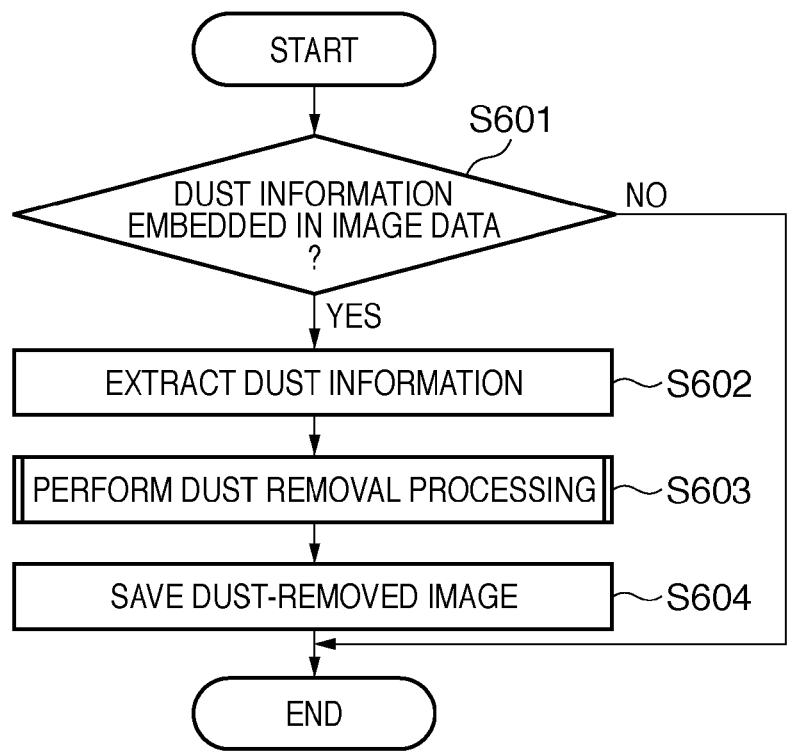
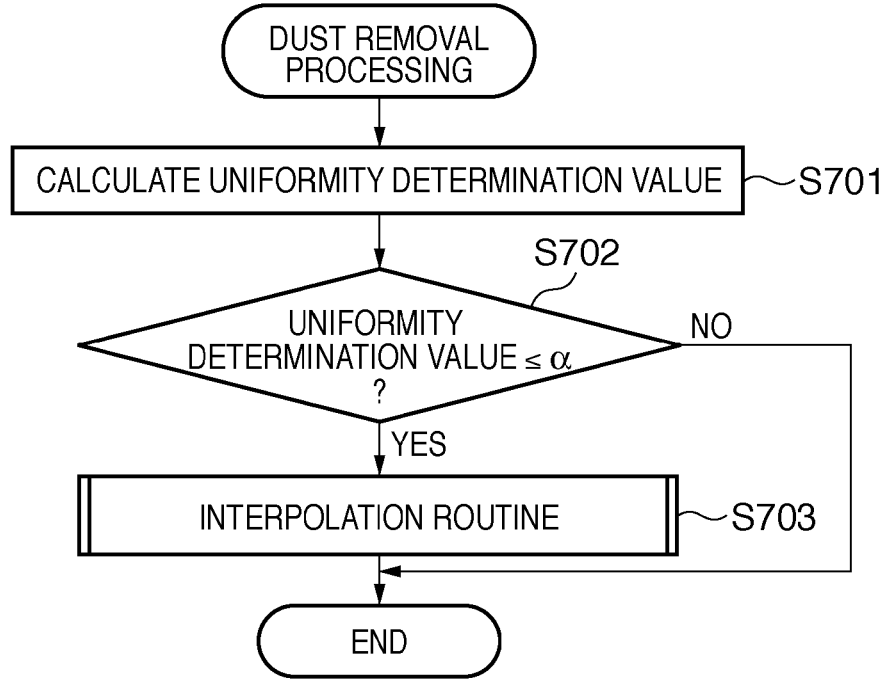

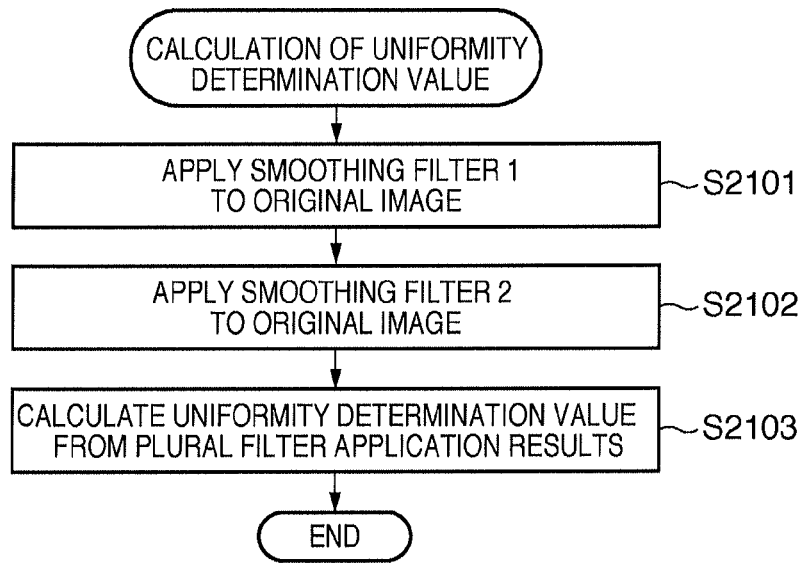
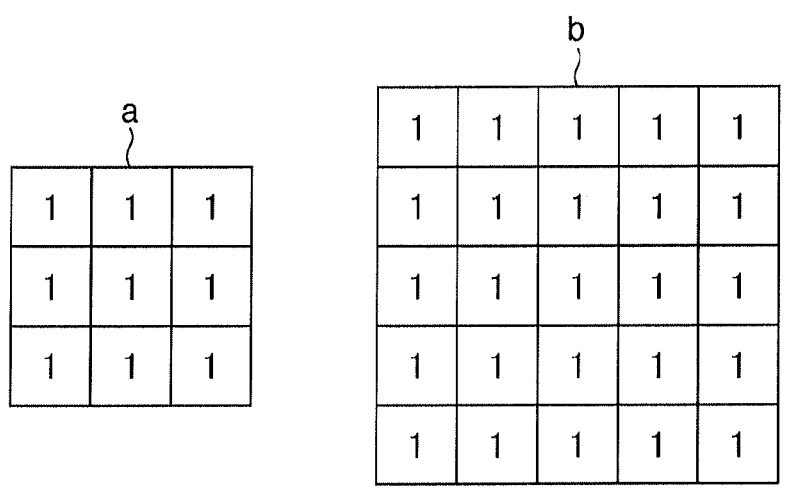

FIG. 15
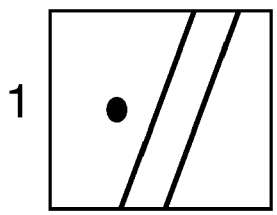
1
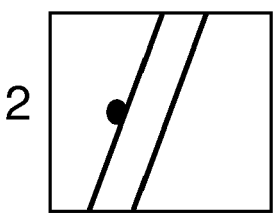
2
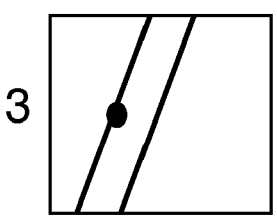
3
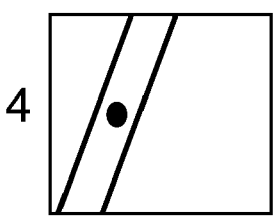
4
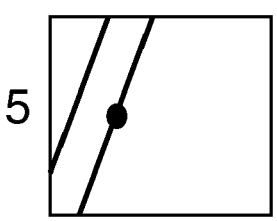
5
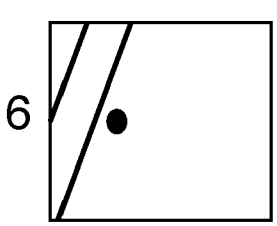
6
FIG. 16
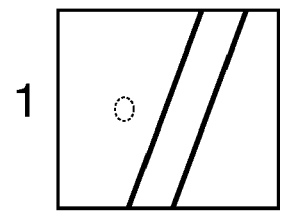
1
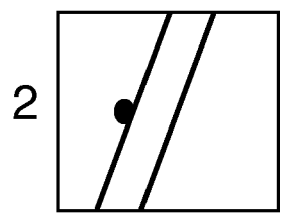
2
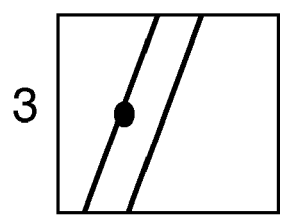
3
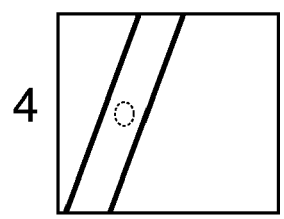
4
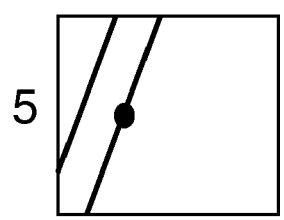
5
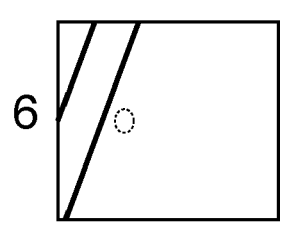
6

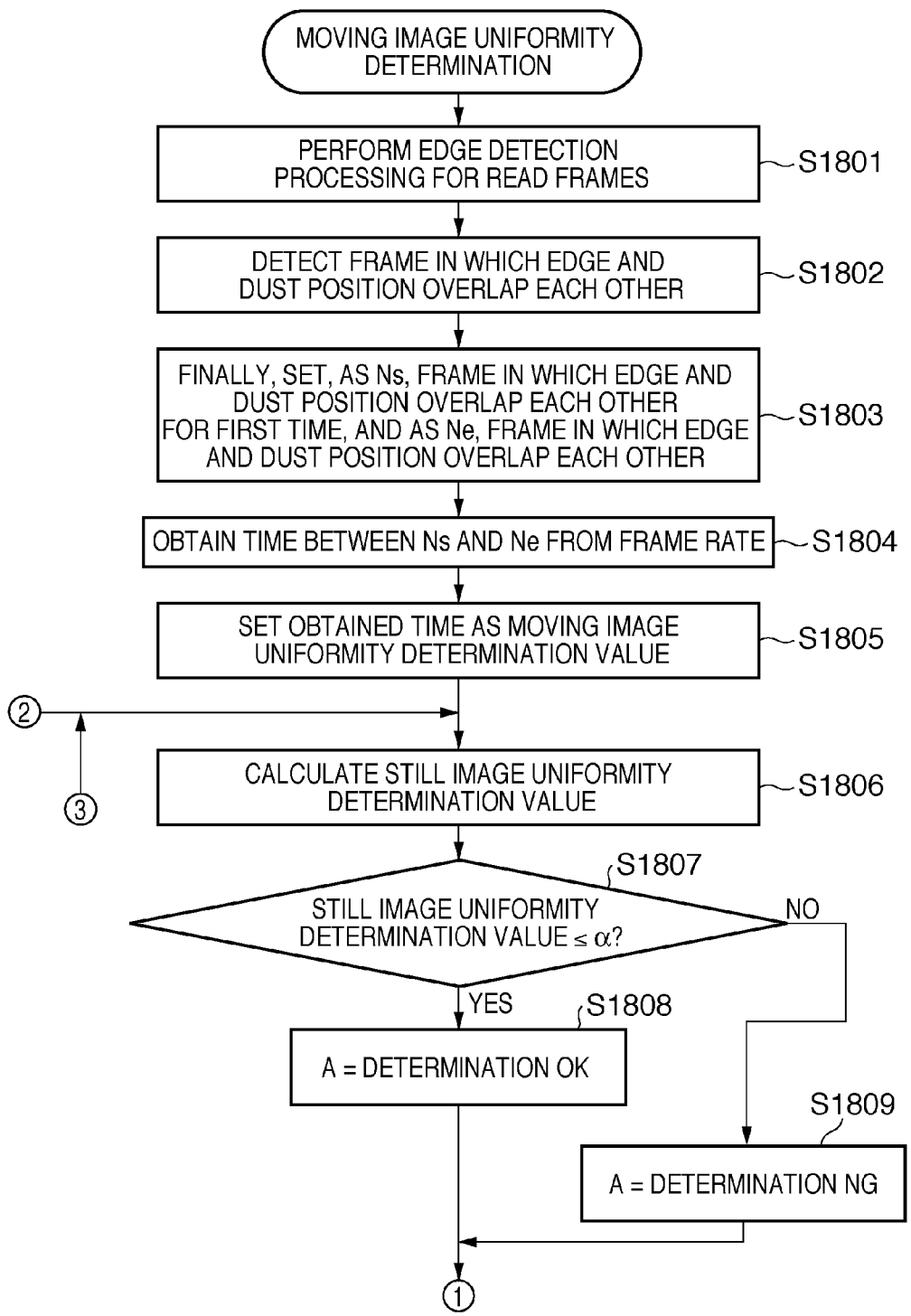

FIG. 19

| FRAME NUMBER | DUST NUMBER | DETERMINATION RESULT |
|---|---|---|
| 0 | 1 | OK |
| 0 | 2 | NG |
| 0 | ---- | ---- |
| 0 | n-1 | OK |
| 0 | n | OK |
| 1 | 1 | NG |
| 1 | 2 | OK |
| 1 | ---- | ---- |
| 1 | n-1 | OK |
| 1 | n | NG |
| ---- | 1 | ---- |
| ---- | 2 | ---- |
| ---- | ---- | ---- |
| ---- | n-1 | ---- |
| ---- | n | ---- |
| N-1 | 1 | NG |
| N-1 | 2 | OK |
| N-1 | ---- | ---- |
| N-1 | n-1 | OK |
| N-1 | n | OK |
| N | 1 | NG |
| N | 2 | OK |
| N | ---- | ---- |
| N | n-1 | OK |
| N | n | OK |

FIG. 20
1 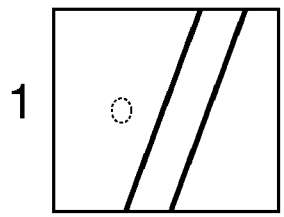
2 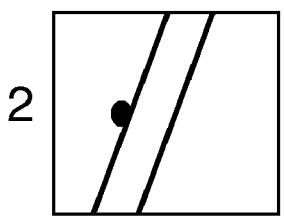
3 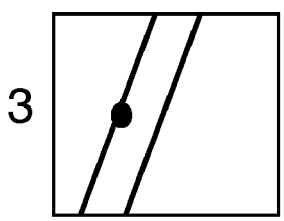
4 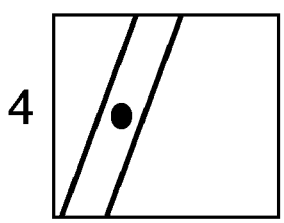
5 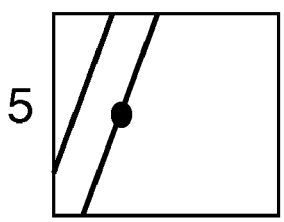
6 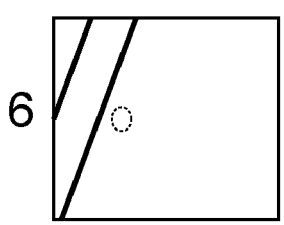
FIG. 21
1 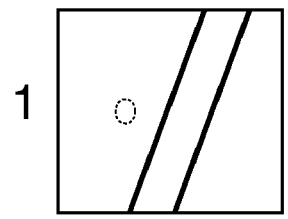
2 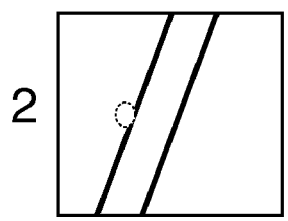
3 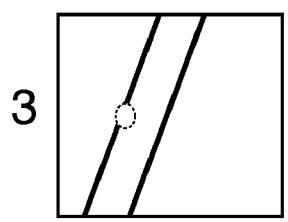
4 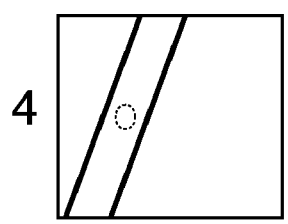
5 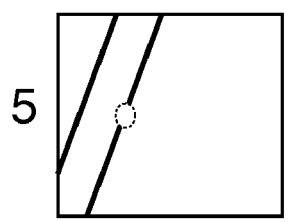
6 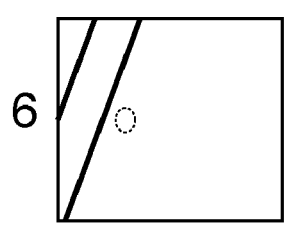

IMAGE PROCESSING APPARATUS, CONTROL METHOD THEREFOR, AND PROGRAM

BACKGROUND OF THE INVENTION

1. Field of the Invention

The present invention relates to a technique of suppressing deterioration of image quality caused by a foreign substance adhering to the surface of an optical low-pass filter or the like in an image capturing apparatus using an image sensor such as a CCD sensor or CMOS sensor.

2. Description of the Related Art

When the lens is detached from the camera body of a lens-interchangeable digital camera, dust floating in the air may enter the camera body. The camera incorporates various mechanical units such as a shutter mechanism which operate mechanically. The operation of these mechanical units may generate dust such as metal powder in the camera body.

When a foreign substance such as dust of any type adheres to the surface of an optical low-pass filter which is an optical element arranged in front of an image sensor and forms the image capturing unit of a digital camera, the shadow of the foreign substance is captured within the image, deteriorating the image quality.

A camera using silver-halide film feeds the film for each shot. Hence, images never contain the shadow of the same foreign substance at the same position continuously. However, a digital camera requires no operation to feed the film frame for each shot, and therefore, captured images may continuously contain the shadow of the same foreign substance at the same position.

To solve this problem, there is proposed a method of correcting a pixel that captures the shadow of a foreign substance by using the signals of neighboring pixels or the like. As a technique of correcting such a pixel, for example, Japanese Patent Laid-Open No. 6-105241 proposes a pixel defect correction method of correcting the pixel defect of an image sensor. Japanese Patent Laid-Open No. 2004-242158 proposes a method which simplifies setting of position information of a pixel defect. According to this method, the extension of an image file recorded in a dust acquisition mode is changed from that of a normal image. The PC (Personal Computer) automatically discriminates a dust information image, and corrects a target image based on this information.

Recently, there is proposed a technique of handling moving image information as digital data and encoding it at high compression rate with high image quality to accumulate and transmit it. This technique is becoming popular.

Motion JPEG (Joint Photographic Experts Group) encodes a moving image by applying still image encoding (e.g., JPEG encoding) to each frame. Although JPEG encoding basically targets still images, products which apply JPEG encoding to even moving images by high-speed processing have come into practical use.

H.264 (MPEG4-Part10 AVC) is an encoding method aiming at higher compression rates and higher image quality. It is known that H.264 requires more intensive computation for encoding and decoding than those in conventional encoding methods such as MPEG2 and MPEG4, but can achieve higher coding efficiencies (see ISO/IEC 14496-10, "Advanced Video Coding").

Compact digital cameras capable of recording a moving image based on these encoding methods have also been developed and commercialized. Users can easily view images with such a digital camera, a personal computer, a DVD player, and the like.

In this situation, a need is recently growing for recording higher-resolution moving images with a larger number of pixels by lens-interchangeable digital cameras as well as compact digital cameras. However, as described above, due to a variety of factors lens-interchangeable digital cameras suffer the problem of dust adhering to the surface of an image sensor. If the lens-interchangeable digital camera records a moving image while dust adheres to the surface, the shadow of dust may always appear at the same position during moving image playback.

According to a conventional dust removal method based on image processing for the lens-interchangeable digital camera, information (e.g., information on the position and size of dust) necessary for dust removal and image data are recorded. The image is loaded later into a personal computer or the like to remove the shadow of dust by interpolation processing using pixels around the dust region. That is, the recorded image data contains the shadow of dust. As for still images, dust removal is executed for each one. As for a moving image, dust removal must be performed for the full recording time.

A dust removal method for a still image interpolates a dust shadow-containing region using neighboring pixels. At this time, even if an image around the pixels of the dust region is not uniform, a resultant image becomes unnatural at the boundary between the interpolated dust region and its surrounding region. In contrast, when removing the shadow of dust from a moving image for the full recording time, the dust position is unchanged between frames. However, an image around the dust shadow-containing region changes. That is, an image around the dust shadow-containing region differs between frames. A resultant image becomes unnatural not only in each frame like a still image, but also between successive frames.

For example, FIG. 15 is a view showing six frames 1 to 6 which are extracted from a moving image recorded for an arbitrary time and arranged in time series. In FIG. 15, the dot mark (•) represents dust. This moving image is captured while panning the camera rightward with respect to two ropes indicated by solid lines.

When dust removal processing is performed for a moving image as shown in FIG. 15, dust shadows in frames 1, 4, and 6 are interpolated (the ○ mark of a broken line represents a corrected dust shadow), and those in the remaining frames are not interpolated. When the moving image in FIG. 15 is played back, the shadow of dust at the same position between frames is corrected and disappears in some frames, but is not corrected and appears in other frames, as shown in FIG. 16. The dust removal processing makes a moving image unnatural.

SUMMARY OF THE INVENTION

The present invention prevents playback of an unnatural moving image when dust removal is performed for a moving image.

According to the first aspect of the present invention, there is provided an image processing apparatus which corrects input image data based on the image data and foreign substance information containing information on a position and size of a foreign substance adhering to an optical element arranged in front of an image sensor in an image capturing apparatus that captures the image data, the apparatus comprising: a correction unit which corrects the image data so as to reduce influence of a shadow of the foreign substance contained in the image data, based on the image data and the foreign substance information; a still image uniformity determination unit which determines uniformity of an image in a region around the foreign substance in the image data, the still image uniformity determination unit being applied when input image data is a still image; a moving image uniformity determination unit which determines the uniformity of the image in the region around the foreign substance in the image data based on a determination criterion different from a determination criterion applied to a still image by the still image uniformity determination unit, the moving image uniformity determination unit being applied when input image data is a moving image; and a control unit which inhibits correction of the image data by the correction unit when either of the still image uniformity determination unit and the moving image uniformity determination unit determines that the uniformity is not larger than a predetermined value.

According to the second aspect of the present invention, there is also provided a method of controlling an image processing apparatus which corrects input image data, based on the image data and foreign substance information containing information on a position and size of a foreign substance adhering to an optical element arranged in front of an image sensor in an image capturing apparatus that captures the image data, the method comprising: a correction step of correcting the image data so as to reduce influence of a shadow of the foreign substance contained in the image data, based on the image data and the foreign substance information; a still image uniformity determination step of determining uniformity of an image in a region around the foreign substance in the image data, the still image uniformity determination step being applied when input image data is a still image; a moving image uniformity determination step of determining the uniformity of the image in the region around the foreign substance in the image data based on a determination criterion different from a determination criterion applied to a still image in the still image uniformity determination step, the moving image uniformity determination step being applied when input image data is a moving image; and a control step of inhibiting correction of the image data in the correction step when uniformity is determined in either of the still image uniformity determination step and the moving image uniformity determination step to be not larger than a predetermined value.

Further features of the present invention will become apparent from the following description of exemplary embodiments with reference to the attached drawings.

BRIEF DESCRIPTION OF THE DRAWINGS

FIG. 5 is a view showing the structure of a dust information profile;

FIG. 6 is a flowchart showing still image capturing processing in normal shooting;

FIG. 7 is a flowchart showing the operation of dust removal processing;

FIG. 8 is a flowchart showing the sequence of dust removal processing in step S603 of FIG. 7;

FIG. 9 is a flowchart showing the sequence of uniformity determination value calculation processing in step S701 of FIG. 8;

FIG. 10 is a view exemplifying smoothing filters;

FIG. 15 is a view exemplifying a moving image containing the shadow of dust;

FIG. 16 is a view exemplifying a result of applying the same dust removal processing as that for a still image to a dust shadow-containing moving image;

FIGS. 18A and 18B are flowcharts showing the sequence of moving image uniformity determination processing in step S1704 of FIG. 17 in the first embodiment;

FIG. 19 is a table showing the structure of a moving image uniformity determination result;

FIG. 20 is a view exemplifying a result of applying the dust removal processing in the first embodiment to a dust shadow-containing moving image;

FIG. 21 is a view exemplifying a result of applying dust removal processing in the second embodiment to a dust shadow-containing moving image.

DESCRIPTION OF THE EMBODIMENTS

Embodiments of the present invention will now be described in detail with reference to the accompanying drawings.

(First Embodiment)

Figure 1:
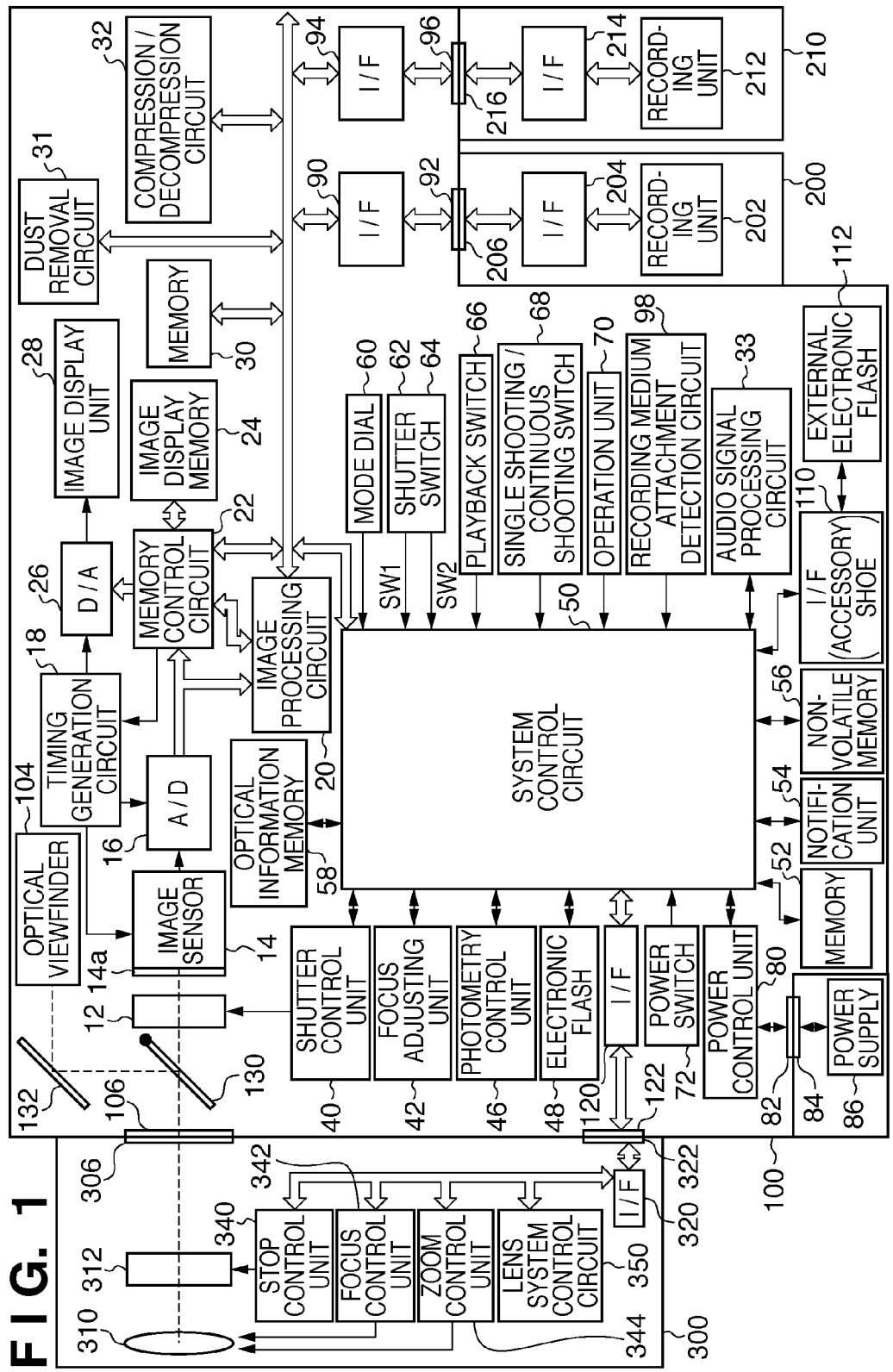
FIG. 1 is a block diagram showing the arrangement of an image capturing apparatus having an image processing function in the first embodiment of the present invention.

FIG. 1 is a block diagram showing the arrangement of an image capturing apparatus having an image processing function in the first embodiment of the present invention. The first embodiment will exemplify a lens-interchangeable single-lens reflex digital still camera as the image capturing apparatus. The present invention is also applicable to, for example, a lens-interchangeable digital video camera as the image capturing apparatus.

As shown in FIG. 1, the image capturing apparatus according to the embodiment mainly includes a camera body 100 and an interchangeable-lens type lens unit 300.

The lens unit 300 includes an imaging lens 310 formed from a plurality of lenses, a stop 312, and a lens mount 306 which mechanically connects the lens unit 300 to the camera body 100. The lens mount 306 incorporates various functions for electrically connecting the lens unit 300 to the camera body 100. In the lens mount 306, an interface 320 connects the lens unit 300 to the camera body 100. A connector 322 electrically connects the lens unit 300 to the camera body 100.

The connector 322 also has a function of exchanging control signals, status signals, and data signals between the camera body 100 and the lens unit 300 and receiving currents of various voltages. The connector 322 may communicate not only by telecommunication but also by optical communication or audio communication.

A stop control unit 340 controls the stop 312 in cooperation with a shutter control unit 40 (to be described later) which controls a shutter 12 of the camera body 100 based on photometry information from a photometry control unit 46. A focus control unit 342 controls focusing of the imaging lens 310. A zoom control unit 344 controls zooming of the imaging lens 310.

A lens system control circuit 350 controls the overall lens unit 300. The lens system control circuit 350 has a memory for storing constants, variables, and programs for operations. The lens system control circuit 350 also has a nonvolatile memory for holding identification information such as a number unique to the lens unit 300, management information, functional information such as maximum and minimum aperture values and a focal length, and current and past set values.

The arrangement of the camera body 100 will be described next.

A lens mount 106 mechanically connects the camera body 100 to the lens unit 300. Mirrors 130 and 132 guide a light beam which has entered the imaging lens 310 to an optical viewfinder 104 by the single-lens reflex method. The mirror 130 can be either a quick return mirror or a half mirror. Reference numeral 12 denotes a focal plane shutter. An image sensor 14 is formed from a CCD sensor, CMOS sensor, or the like, and photoelectrically converts an object image. An optical element 14a such as an optical low-pass filter is arranged in front of the image sensor 14. An image generated by the image sensor 14 contains the shadow of a foreign substance such as dust adhering to the surface of the optical element 14a, deteriorating the image quality. The embodiment is directed to a technique of suppressing the deterioration of image quality.

The light beam which has entered the imaging lens 310 is guided via the stop 312 serving as a light quantity restriction means, the lens mounts 306 and 106, the mirror 130, and the shutter 12 by the single-lens reflex method, and forms an optical image on the image sensor 14.

An A/D converter 16 converts an analog signal (output signal) output from the image sensor 14 into a digital signal. A timing generation circuit 18 supplies clock signals and control signals to the image sensor 14, the A/D converter 16, and a D/A converter 26. The timing generation circuit 18 is controlled by a memory control circuit 22 and system control circuit 50.

An image processing circuit 20 executes predetermined pixel interpolation processing and color conversion processing for data from the A/D converter 16 or data from the memory control circuit 22. If necessary, the image processing circuit 20 performs predetermined arithmetic processing using image data output from the A/D converter 16. Based on the obtained arithmetic result, the system control circuit 50 can execute auto-focus (AF) processing, auto-exposure (AE) processing, and pre-electronic flash (EF) processing of TTL (Through The Lens) scheme to control the shutter control unit 40 and a focus adjusting unit 42. The image processing unit 20 also executes predetermined arithmetic processing using image data output from the A/D converter 16 and performs automatic white balance (AWB) processing of TTL scheme based on the obtained arithmetic result.

In the example shown in FIG. 1 in the embodiment, the focus adjusting unit 42 and photometry control unit 46 are provided for exclusive use. AF processing, AE processing, and EF processing may be performed using not the image processing circuit 20 but the focus adjusting unit 42 and photometry control unit 46. Alternatively, AF processing, AE processing, and EF processing may be performed first using the focus adjusting unit 42 and photometry control unit 46 and then using the image processing circuit 20.

The memory control circuit 22 controls the A/D converter 16, the timing generation circuit 18, the image processing circuit 20, an image display memory 24, the D/A converter 26, a memory 30, and a compression/decompression circuit 32. Image data output from the A/D converter 16 is written in the image display memory 24 or memory 30 via the image processing circuit 20 and memory control circuit 22 or via only the memory control circuit 22.

Display image data written in the image display memory 24 is displayed on an image display unit 28 such as a TFT type LCD via the D/A converter 26. The image display unit 28 sequentially displays captured image data, thereby implementing an electronic viewfinder (EVF) function. The image display unit 28 can arbitrarily turn on/off its display in accordance with an instruction from the system control circuit 50. When display is OFF, the power consumption of the camera body 100 can greatly be reduced.

The memory 30 is used to store captured still images or moving images and has a memory capacity sufficient to store a predetermined number of still images or a predetermined amount of moving image data. Even in continuous shooting or panoramic shooting to continuously capture a plurality of still images, many images can be written in the memory 30 at high speed. When a moving image is captured, the memory 30 is used as a frame buffer to successively write images at a predetermined rate. The memory 30 is also usable as the work area of the system control circuit 50.

A dust removal circuit 31 removes the shadow of dust contained in image data by image processing using dust information stored in a nonvolatile memory 56 (to be described later) and optical information obtained from the lens unit 300.

The compression/decompression circuit 32 compresses/decompresses image data using a known compression method. The compression/decompression circuit 32 reads out an image from the memory 30, compresses or decompresses it, and writes the processed data in the memory 30 again. The compression/decompression circuit 32 also has a function of compression-encoding moving image data into a predetermined format, or decompressing predetermined compression-encoded data into a moving image signal.

An audio signal processing circuit 33 has a function of encoding an audio signal input from a microphone (not shown) into a predetermined encoding format, or decoding predetermined encoded data into an audio signal. The digital camera in the embodiment has a function of outputting audio data decoded by the audio signal processing circuit 33 from a loudspeaker (not shown).

The shutter control unit 40 controls the shutter 12 in cooperation with the stop control unit 340 that controls the stop 312 based on photometry information from the photometry control unit 46. The focus adjusting unit 42 executes AF (Auto Focus) processing. A light beam which has entered the imaging lens 310 of the lens unit 300 is guided via the stop 312, the lens mounts 306 and 106, the mirror 130, and a focus adjusting sub-mirror (not shown) by the single-lens reflex method, measuring the focus state of an image formed as an optical image.

The photometry control unit 46 executes AE (Auto Exposure) processing. A light beam which has entered the imaging lens 310 of the lens unit 300 is guided via the stop 312, the lens mounts 306 and 106, the mirror 130, and a photometry sub-mirror (not shown) by the single-lens reflex method, measuring the exposure state of an image formed as an optical image. An electronic flash 48 has an AF auxiliary light projecting function and an electronic flash control function. The photometry control unit 46 also has an EF (Electronic Flash control) processing function in cooperation with the electronic flash 48.

AF control may also be done based on the measurement result of the focus adjusting unit 42 and an arithmetic result obtained by arithmetically processing image data from the A/D converter 16 by the image processing circuit 20. Exposure control may also be performed based on the measurement result of the photometry control unit 46 and an arithmetic result obtained by arithmetically processing image data from the A/D converter 16 by the image processing circuit 20.

The system control circuit 50 controls the overall camera body 100 and incorporates a known CPU. A memory 52 stores constants, variables, and programs for the operation of the system control circuit 50.

A notification unit 54 notifies the outside of operation states, messages, and the like using a text, image, and sound in accordance with program execution by the system control circuit 50. Examples of the notification unit 54 are a display unit such as an LCD or LED for visual display and a sound generation element for generating a notification by sound. The notification unit 54 includes one of them or a combination of two or more of them. In particular, the display unit is arranged at one or a plurality of visible positions near an operation unit 70 of the camera body 100. The optical viewfinder 104 incorporates some functions of the notification unit 54.

The display contents of the image display unit 28 such as an LCD among those of the notification unit 54 include display associated with shooting modes (e.g., single shooting/continuous shooting and self timer), display associated with recording (e.g., compression rate, the number of recording pixels, the number of recorded images, and the number of recordable images), and display associated with shooting conditions (e.g., shutter speed, aperture value, exposure compensation, brightness compensation, external flash light emission amount, and red eye mitigation). The image display unit 28 also displays macro shooting, buzzer setting, battery level, error message, numerical information by a plurality of digits, and the attached/detached states of a recording medium 200 and PC 210. The image display unit 28 also displays the attached/detached state of the lens unit 300, communication I/F operation, date and time, and the connection state of an external computer.

Some of the display content of the notification unit 54 is indicated in the optical viewfinder 104, including, for example, in-focus, ready for shooting, camera shake warning, flash charge, flash charge completion, shutter speed, aperture value, exposure compensation, and recording medium write operation.

The nonvolatile memory 56 is an electrically erasable/programmable memory such as an EEPROM and stores programs (to be described later) and the like.

An optical information memory 58 stores various kinds of lens information (to be described later) obtained from the lens unit 300 via a connector 122.

Reference numerals 60, 62, 64, 66, 68, and 70 denote operation means for inputting various types of operation instructions of the system control circuit 50. They include a single component or a combination of components such as a switch, dial, touch panel, pointing by line-of-sight detection, and voice recognition device.

The operation means will be described here in detail.

The mode dial switch 60 can selectively set a functional shooting mode such as an automatic shooting mode, programmed shooting mode, shutter speed priority shooting mode, stop priority shooting mode, manual shooting mode, or focal depth priority (depth) shooting mode. The mode dial switch 60 can also selectively set a functional shooting mode such as a portrait shooting mode, landscape shooting mode, closeup shooting mode, sports shooting mode, nightscape shooting mode, and panoramic shooting mode.

The shutter switch SW1 62 is turned on by operating a shutter button (not shown) halfway (e.g., half stroke) to designate the start of an operation such as AF processing, AE processing, AWB processing, or EF processing.

The shutter switch SW2 64 is turned on by operating the shutter button (not shown) completely (e.g., full stroke) to designate the start of a series of processing operations including exposure, development, and recording. In the exposure processing, a signal read out from the image sensor 14 is written in the memory 30 via the A/D converter 16 and memory control circuit 22. Then, the development processing is performed based on calculation by the image processing circuit 20 or memory control circuit 22. In the recording processing, image data is read out from the memory 30, compressed by the compression/decompression circuit 32, and written in or transmitted to the recording medium 200 or PC 210.

The playback switch 66 designates the start of a playback operation to read out an image captured in a shooting mode from the memory 30, recording medium 200, or PC 210 and display it on the image display unit 28. The playback switch 66 can set another functional mode such as a playback mode, multiwindow playback/erase mode, or PC-connected mode.

The single shooting/continuous shooting switch 68 can set a single shooting mode in which when the user presses the shutter switch SW2 64, the camera shoots one frame and then stands by, or a continuous shooting mode in which the camera keeps shooting while the user presses the shutter switch SW2 64.

The operation unit 70 includes various buttons and a touch panel. For example, the operation unit 70 includes a live view start/stop button, moving image recording start/stop button, menu button, set button, multiwindow playback/page feed button, flash setting button, single shooting/continuous shooting/self timer switch button, menu move plus (+) button, and menu move minus (−) button. The operation unit 70 further includes a playback image move plus (+) button, playback image move minus (−) button, shooting image quality select button, exposure compensation button, brightness compensation button, external flash light emission amount setting button, and date/time setting button. The numerical values or functions of the plus and minus buttons can be selected more easily using a rotary dial switch.

Also, the operation unit 70 includes an image display ON/OFF switch for turning on/off the image display unit 28, and a quick review ON/OFF switch for setting a quick review function of automatically playing back image data obtained immediately after shooting. The operation unit 70 includes a compression mode switch for selecting a compression rate for JPEG compression, or a RAW mode to directly digitize a signal from the image sensor and record it on a recording medium. The operation unit 70 includes an AF mode setting switch capable of setting a one-shot AF mode and servo AF mode. In the one-shot AF mode, the auto-focus operation starts when the user presses the shutter switch SW1 62. Once an in-focus state is obtained, this state is kept held. In the servo AF mode, the auto-focus operation continues while the user presses the shutter switch SW1 62. The operation unit 70 further includes a setting switch capable of setting a dust information acquisition mode to capture a dust detection image and acquire dust information, as will be described later.

A power switch 72 can selectively set the power ON or power OFF mode of the camera body 100. The power switch 72 can also selectively set the power ON or power OFF mode of each of various accessories such as the lens unit 300, an external electronic flash 112, the recording medium 200, and the PC 210 connected to the camera body 100.

A power supply control unit 80 includes a cell detection circuit, DC/DC converter, and switching circuit for switching a block to be energized. The power supply control unit 80 detects the attachment/detachment of a cell, the type of cell, and the battery level. The power supply control unit 80 controls the DC/DC converter based on the detection result and an instruction from the system control circuit 50, supplying a necessary voltage to the units including a recording medium for a necessary period.

Reference numerals 82 and 84 denote connectors; and 86, a power supply unit formed from a primary cell (e.g., alkaline cell or lithium cell), a secondary cell (e.g., NiCd cell, NiMH cell, Li-ion cell, or Li-polymer cell), or an AC adapter.

Reference numerals 90 and 94 denote interfaces with a PC or a recording medium (e.g., memory card or hard disk); and 92 and 96, connectors to connect a PC or a recording medium (e.g., memory card or hard disk). A recording medium attachment detection circuit 98 detects whether the recording medium 200 or PC 210 is attached to the connectors 92 and/or 96.

In the embodiment, there are two systems of interfaces and connectors to connect a recording medium. The interfaces and connectors to connect a recording medium can have either one or a plurality of systems. Interfaces and connectors of different standards may also be combined.

Interfaces and connectors compliant with various storage medium standards are usable. Examples are a PCMCIA (Personal Computer Memory Card International Association) card, CF (CompactFlash®) card, and SD card. When the interfaces 90 and 94 and the connectors 92 and 96 comply with the standard of the PCMCIA card or CF® card, they allow connecting various kinds of communication cards. Examples of the communication cards are a LAN card, modem card, USB (Universal Serial Bus) card, and IEEE (Institute of Electrical and Electronic Engineers) 1394 card. A P1284 card, SCSI (Small Computer System Interface) card, and PHS are also available. Image data and management information associated with it can be transferred to another computer or a peripheral device such as a printer by connecting these kinds of communication cards.

The optical viewfinder 104 can display an optical image formed by a light beam which enters the imaging lens 310 and is guided via the stop 312, lens mounts 306 and 106, and mirrors 130 and 132 by the single-lens reflex method. It is therefore possible to perform shooting using not the electronic viewfinder function of the image display unit 28 but only the optical viewfinder. Some functions of the notification unit 54 such as an in-focus state, camera shake warning, flash charge, shutter speed, aperture value, and exposure compensation are displayed in the optical viewfinder 104.

The external electronic flash 112 is attached via an accessory shoe 110.

An interface 120 connects the camera body 100 to the lens unit 300 in the lens mount 106.

The connector 122 electrically connects the camera body 100 to the lens unit 300. A lens attachment detection unit (not shown) detects whether the lens unit 300 is attached to the lens mount 106 and connector 122. The connector 122 also has a function of exchanging control signals, status signals, data signals, and the like between the camera body 100 and the lens unit 300 and supplying currents of various voltages.

The optical information memory 58 of the camera body 100 stores various kinds of optical information (e.g., aperture value, zoom position, pupil position, and focal length) of the lens unit 300 that are communicated via the connector 122. The communication of the information is sometimes requested by the camera, or the information is communicated from the lens every time it is updated.

The connector 122 may communicate not only by telecommunication but also by optical communication or audio communication.

The recording medium 200 is a memory card or hard disk. The recording medium 200 includes a recording unit 202 formed from a semiconductor memory or magnetic disk, an interface 204 with the camera body 100, and a connector 206 to connect the camera body 100.

As the recording medium 200, a memory card (e.g., PCM-CIA card or CompactFlash®), or a hard disk is usable. The recording medium 200 may also be a micro DAT, a magneto-optical disk, an optical disk (e.g., CD-R or CD-RW), or a phase-change optical disk (e.g., a DVD).

The PC 210 includes a recording unit 212 formed from a magnetic disk (HD), an interface 214 with the camera body 100, and a connector 216 to connect the camera body 100. The interface 214 can be a USB, IEEE1394, or the like, but is not particularly limited.

Processing to execute image processing to eliminate the influence of dust on the optical member 14a such as a low-pass filter or cover glass arranged in front of the image sensor of the image capturing apparatus having the above-described arrangement will be described next.

In the embodiment, a dust detection image is captured to acquire dust information (foreign substance information) representing the adhesion position, size, and the like of dust (foreign substance). Dust data is extracted to generate dust data. The dust detection image is preferably acquired by capturing a surface having a luminance as uniform as possible. However, uniformity need not be strict because it is desirable to easily capture the image in a familiar place. For example, the embodiment assumes capturing a blue sky or white wall.

Figure 2:
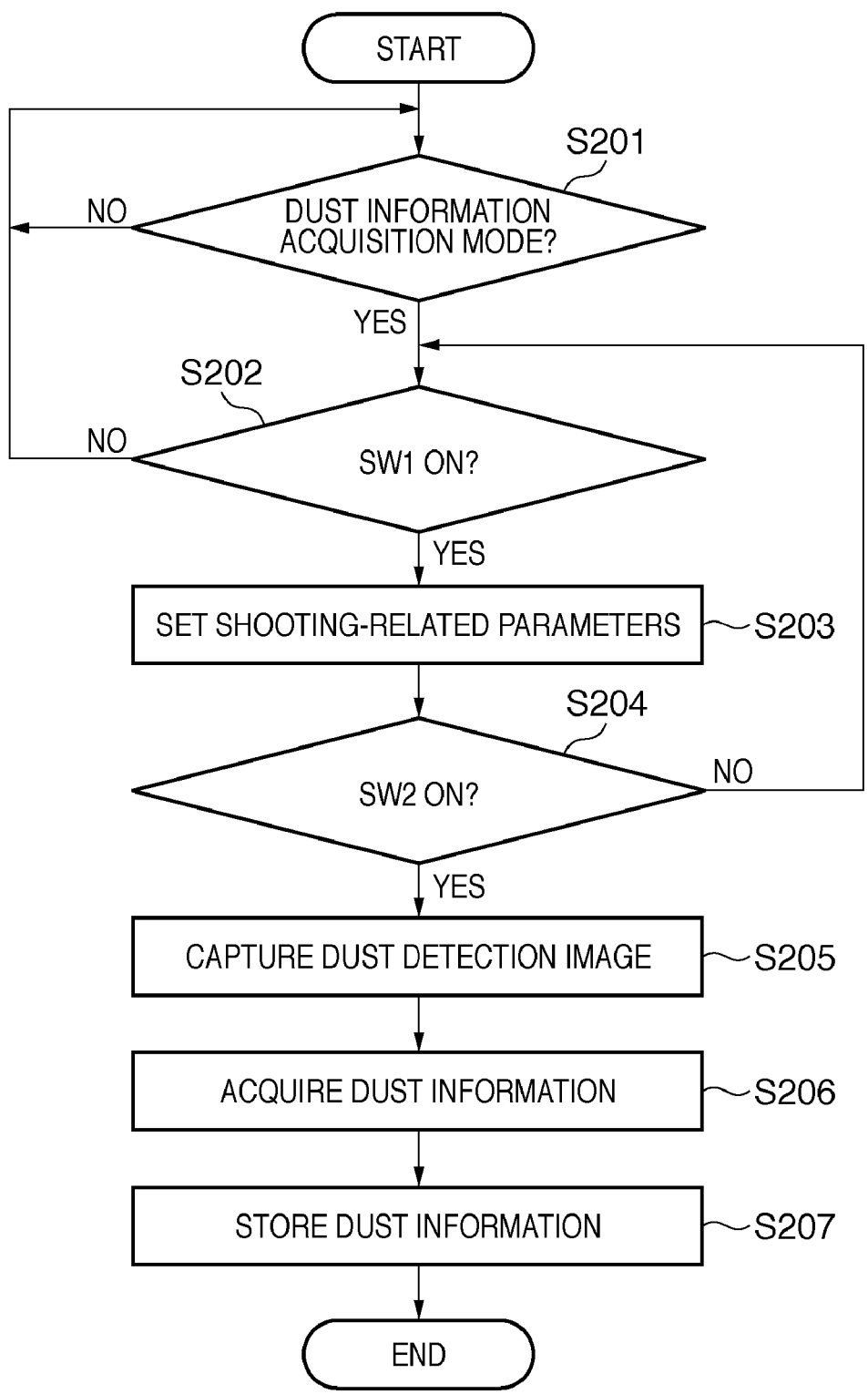
FIG. 2 is a flowchart showing processing in the image capturing apparatus (digital camera in the embodiment) when acquiring dust information.

FIG. 2 is a flowchart showing processing of the image capturing apparatus (digital camera in the embodiment) when acquiring dust information in the embodiment.

First, in step S201, it is determined whether the user has selected the dust information acquisition mode with the operation unit 70. The determination in step S201 is repeated until the dust information acquisition mode is selected. If the user has selected the dust information acquisition mode, the process advances to step S202 to determine whether the user has turned on the shutter switch SW1 62. If the shutter switch SW1 62 is OFF, the process returns to step S201 to repeat the processing.

Figures 3, 4:
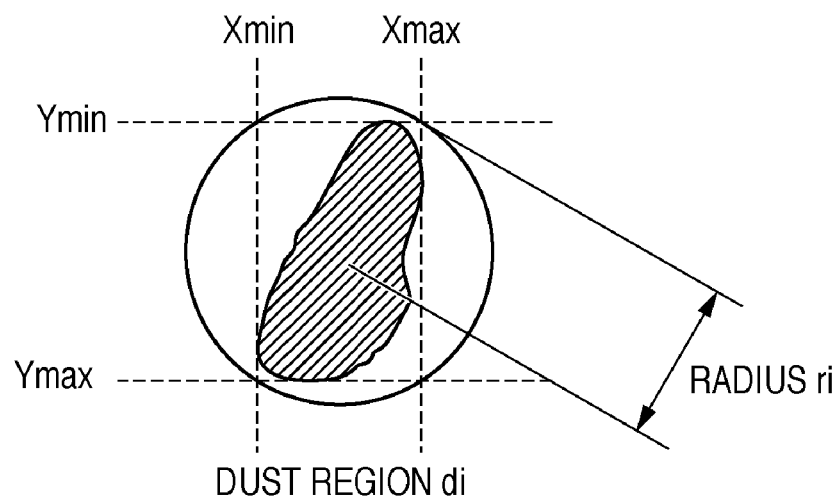
FIG. 3 is a table showing a list of set parameters when acquiring dust information.
FIG. 4 is a view showing an outline of dust region size calculation.

If the user has turned on the shutter switch SW1 62, the aperture value, ISO value, shutter speed, and other shooting-related parameters are set in step S203. FIG. 3 shows the parameters set here. The aperture value is set to, for example, F22 to stop down the aperture. Shooting may be done using the minimum aperture within a range settable in the lens unit 300 connected to the lens mount 106. The aperture is stopped down because dust normally adheres not to the surface of the image sensor 14 but to the surface of a protective glass protecting the image sensor 14 or an optical filter (optical element 14a) placed not on the image sensor side but on the object side, and the imaging state changes depending on the aperture value of the lens unit 300. Near the full aperture value, the dust image blurs, and acquisition of appropriate dust detection image becomes difficult. It is therefore preferable to shoot at the minimum aperture.

Referring back to the flowchart in FIG. 2, at this time, the user points the image capturing apparatus to a uniform luminance surface such as a wall as white as possible and operates the shutter switch SW2 64.

In step S204, it is determined whether the user has turned on the shutter switch SW2 64. If the shutter switch SW2 64 is OFF, the process returns to step S202 to determine whether the shutter switch SW1 62 is ON or OFF. If the user has turned on the shutter switch SW2 64, the process advances to step S205. In step S205, the dust detection image (uniform luminance surface) is captured to store the image data in the memory 30. In step S206, dust information is acquired from the image data stored in the memory 30.

The acquisition of dust information will be described. More specifically, the position (coordinates) and size of a dust region are acquired from the captured dust detection image. First, the region of the captured dust detection image is divided into a plurality of blocks. Then, a maximum luminance Lmax and average luminance Lave in each block are calculated. A threshold value T1 in each block is calculated by $$T1 = Lave \times 0.6 + Lmax \times 0.4$$

A dust-adhered pixel is lower in luminance than neighboring pixels. A pixel less than the threshold value T1 is determined as a dust pixel. Each isolated region formed from dust pixels is defined as a dust region di (i=0, ..., n).

FIG. 4 is a view showing an outline of dust region size calculation. As shown in FIG. 4, a maximum value Xmax and minimum value Xmin of the horizontal coordinates and a maximum value Ymax and minimum value Ymin of the vertical coordinates of pixels forming a dust region are acquired for each dust region. A radius ri representing the size of the dust region di is calculated by $$ri = [\sqrt{\{(Xmax - Xmin)^2 + (Ymax - Ymin)^2\}}]/2$$

Center coordinates (Xdi,Ydi) are approximated by $$Xdi = (Xmax + Xmin)/2$$

$$Ydi = (Ymax + Ymin)/2$$

The calculated position (coordinates) and radius are recorded as a dust information profile.

The size of dust correction data (dust information profile) is sometimes limited by the size of the nonvolatile memory 56 or the like. To cope with this case, items of dust position information are sorted by the size and the average luminance value of the dust region. In the embodiment, items of dust position information are sorted in descending order of ri. When ri is constant, items of dust position information are sorted in ascending order of the average luminance value. With this setting, a conspicuous dust image can be preferentially registered in dust correction data. Note that Di represents a sorted dust region, and Ri represents the radius of the dust region Di.

When there is a dust region larger than a predetermined size, it may be excluded from sorting targets and added to the end of a sorted dust region list. This is because if a large dust region undergoes subsequent interpolation processing, it may deteriorate the image quality, and is desirably corrected last.

The dust information profile takes a structure as shown in FIG. 5. As shown in FIG. 5, the dust information profile stores lens information and information of the position and size of dust upon capturing a dust detection image. More specifically, the actual aperture value (F-number) and the lens pupil position upon capturing a dust detection image are stored as the lens information upon capturing the dust detection image. Then, the number (integer value) of detected dust regions is stored in the storage area. Next to this value, the specific parameters of each dust region are stored repeatedly as many as the dust regions. The parameters of the dust region are a set of three numerical values: the radius of dust (e.g., 2 bytes), the x-coordinate of the center of an effective image area (e.g., 2 bytes), and the y-coordinate of the center (e.g., 2 bytes).

The acquired dust information is stored in the nonvolatile memory 56 in step S207, and the processing to acquire dust information ends.

The purpose of a shooting operation in the dust information acquisition mode is to acquire dust information. Thus, in the embodiment, a captured image itself is neither compressed nor recorded on the recording medium 200 so as not to waste the capacity of the recording medium 200 by image data unnecessary for the user. However, an image captured in the dust information acquisition mode may also be compressed and saved in the recording medium 200, similar to a normal image. At this time, the data can be arbitrarily modified by, for example, changing the extension.

The embodiment is directed to a method of performing image processing to correct deterioration of image quality caused by dust when capturing a moving image. Prior to a description of processing for a moving image, processing for a still image will be explained.

When a still image is obtained not by dust detection image shooting but by normal shooting, dust correction data (dust information profile) shown in FIG. 5 is recorded on the recording medium 200 in association with the image data together with camera set values and the like in normal shooting.

More specifically, dust correction data can be associated with image data by adding the dust correction data to, for example, an Exif region which is the header field of an image file where camera set values and the like upon shooting are recorded. Alternatively, the dust correction data is recorded as an independent file, and only link information to the dust correction data file is recorded in image data, thereby associating the dust correction data and image data. However, if the image file and dust correction data file are recorded separately, the link relationship may be lost upon moving the image file. To prevent this, the dust correction data is preferably held together with the image data.

Dust correction data is recorded in association with image data on the assumption that image data recorded together with dust correction data is moved to an external image processing apparatus and the external image processing apparatus executes dust removal processing.

Dust removal processing upon normal shooting based on dust information stored in the nonvolatile memory 56 in the above-described way will be explained next with reference to the flowcharts of FIGS. 6 and 7. The following description concerns dust removal processing for a still image. However, the dust removal processing for a still image can be similarly applied to a moving image by executing the processing for an image of every frame. The dust removal circuit 31 in FIG. 1 executes the dust removal processing.

FIG. 6 shows still image capturing processing in normal shooting in the embodiment.

In step S501, the process waits until the user turns on the shutter switch SW1 62. When the user turns on the shutter switch SW1 62, the process advances to step S502 to perform photometry processing and focus adjustment processing. In step S503, it is determined whether the user has turned on the shutter switch SW2 64. If the shutter switch SW2 64 is OFF, the process returns to step S501 to repeat the processing. If it is detected that the user has turned on the shutter switch SW2 64, the process advances to step S504 to perform shooting. After the end of shooting, the process advances to step S505 to determine whether valid dust information exists in the nonvolatile memory 56. If dust information exists, the process advances to step S506. If no dust information exists, the process advances to step S507 to record the captured image data on the recording medium 200.

In the embodiment, it is determined whether dust information exists in the nonvolatile memory 56. However, the necessary condition is whether shooting is done in the dust information acquisition mode, so the determination method is not particularly limited. It is also possible to, for example, set a flag in shooting in the dust information acquisition mode and evaluate it.

In step S506, the acquired dust information is embedded in the header field (e.g., Exif field) of the captured image data. In step S507, the dust information-embedded image data is recorded on the recording medium 200.

The operation of dust removal processing will be explained with reference to FIG. 7.

In step S601, it is determined whether dust information is embedded in a selected image. If dust information is embedded in a selected image, the process advances to step S602 to extract the dust information. In step S603, correction processing such as pixel interpolation processing based on pixels around dust is executed in accordance with the extracted dust information to eliminate the influence of the dust from the image data.

More specifically, a coordinate sequence Di (i=1, 2, ..., n), a radius sequence Ri (i=1, 2, ..., n), an aperture value f1, and a lens pupil position L1 are acquired from the extracted dust correction data. Ri represents the size of dust at the coordinates Di obtained upon sorting dust correction data. f1 represents the aperture value of the lens upon capturing a dust detection image. L1 represents the pupil position of the lens similarly upon capturing a dust detection image. An aperture value f2 and lens pupil position L2 upon normal image capture are obtained, and Di is converted by the following equation. Converted coordinates Di' and a converted radius Ri' are defined by $$Di'(x,y)=(L2\times(L1-H)\times d/((L2-H)\times L1))\times Di(x,y)$$

$$Ri'=(Ri\times f1/f2+3) \quad (1)$$

where d is the distance from the image center to the coordinates Di, and H is the distance from the surface of the image sensor 14 to dust.

The unit is a pixel, and "+3" of Ri' means a margin.

Dust in a region defined by the coordinates Di' and radius Ri' is detected, and if necessary, interpolation processing is applied. Details of the interpolation processing will be described later. The dust removal processing is applied to all coordinates, and if all coordinates have been processed, the process advances to step S604.

In step S604, an image corrected by eliminating the influence of dust from the captured image is newly recorded.

Then, the dust removal processing ends.

In the embodiment, the camera body 100 records dust information by embedding it in captured image data, and correction processing is performed later to eliminate the influence of dust. However, it is also possible, when capturing and recording an image using the camera body 100, to perform correction processing to eliminate the influence of dust without embedding dust information, and record the corrected image on the recording medium 200.

Details of dust region removal processing will be explained below.

(Dust Removal Processing)

FIG. 8 is a flowchart showing the sequence of dust removal processing in step S603.

In step S701, the uniformity of a region other than a dust region is calculated. In step S702, it is determined whether the calculated value is less than or equal to a threshold α. Only if the value is less than or equal to the threshold α, an interpolation routine in step S703 is executed to perform dust interpolation processing.

The threshold α is set for the average value of luminance variations in filtering processing (to be described later). Applying the filtering processing blurs an isolated point generated by noise or a sharp edge, but hardly changes the luminance of a uniform portion. In view of this, the luminance difference before and after applying the filtering processing is calculated and used to determine whether the region of interest is uniform. If the luminance difference before and after the application is less than or equal to the threshold α, it is determined that the region of interest is uniform. In the embodiment, for example, the threshold α is 6 for an 8-bit pixel value.

FIG. 9 is a flowchart showing the sequence of uniformity determination value calculation processing.

In step S2101, a filter shown referred to by reference numeral a of FIG. 10 is applied to the luminance component of each pixel in a designated region, obtaining first bitmap data formed from luminance components after applying the filter. For example, the luminance component is calculated by $$Y=0.299\times R+0.587\times G+0.114\times B$$

The filter referred to by reference numeral a of FIG. 10 is a smoothing filter. This filter generates a new pixel value by uniformly weighting and averaging nine pixels including the pixel of interest, that is, an upper left pixel, upper pixel, upper right pixel, left pixel, pixel of interest, right pixel, lower left pixel, lower pixel, and lower right pixel.

In step S2102, a filter referred to by reference numeral b of FIG. 10 is applied to the luminance component of each pixel in the designated region, obtaining second bitmap data formed from luminance components after applying the filter. The filter referred to by reference numeral b of FIG. 10 generates a new pixel value by uniformly weighting and averaging 25 neighboring pixels including the pixel of interest.

In step S2103, the average value of corresponding pixel differences between the first and second bitmap data is calculated as a uniformity determination value.

This processing can extract a uniform region while eliminating the influence of the noise component of an image to a certain degree. Then, appropriate interpolation processing can be performed.

(Interpolation Routine)

Figure 11:
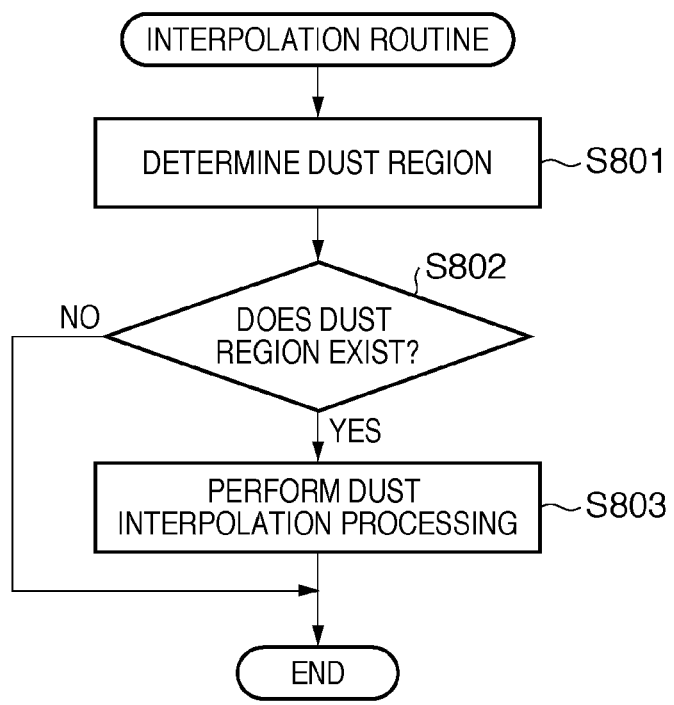
FIG. 11 is a flowchart showing the sequence of an interpolation routine in step S703 of FIG. 8.

FIG. 11 is a flowchart showing the sequence of the interpolation routine in step S703 of FIG. 8.

In step S801, a dust region is determined. The dust region is defined as a region which satisfies all the following conditions:

(1) a region which is darker than that of a threshold value T2 calculated based on an average luminance Yave and maximum luminance Ymax of pixels falling in a region defined by the center coordinates Di' and radius Ri' (Di' and Ri' calculated by equation (1)):

$$T2=Yave\times 0.6+Ymax\times 0.4$$

(2) a region which does not contact a circle having the radius Ri' from the center coordinates Di'.

(3) a region whose radius value calculated by the above-described equation is greater than or equal to X1 pixels and smaller than X2 pixels with respect to an isolated region of low-luminance pixels selected in (1).

(4) a region containing the center coordinates Di of the circle.

In the embodiment, X1 represents three pixels, and X2 represents 30 pixels. This setting allows handling of only a small isolated region as a dust region. When no lens pupil position can be accurately acquired, condition (4) may be eased. For example, when the region of interest contains the coordinates of a range of ±3 pixels from the coordinates Di in both the X and Y directions, it is determined as a dust region.

If such a region (portion) exists in an image signal in step S802, the process advances to step S803 to perform dust region interpolation. If no such region exists, the process ends. The dust region interpolation processing in step S803 adopts a known defective region interpolation method. An example of the known defective region interpolation method is pattern replacement disclosed in Japanese Patent Laid-Open No. 2001-223894. In Japanese Patent Laid-Open No. 2001-223894, a defective region is specified using infrared light. In the embodiment, a dust region detected in step S801 is handled as a defective region, and interpolated by pattern replacement using normal neighboring pixels. For a pixel which cannot be interpolated by pattern replacement, p normal pixels are selected sequentially from one closest to the pixel to be interpolated in image data having undergone pattern interpolation, and the target pixel is interpolated using the average color of them.

In still image dust removal processing, dust correction data is attached to an image in this fashion. The correspondence between dust correction image data and captured image data need not of concern. Since dust correction data is compact data formed from the position, size, and conversion data (aperture value and distance information of the lens pupil position), the size of captured image data does not become excessively large. Only a region containing pixels designated by dust correction data is interpolated, greatly decreasing the probability of a detection error.

Next, a method of performing image processing for a moving image to correct the image quality deteriorated by dust will be explained.

The quality of a moving image can be corrected similarly to a still image by attaching dust correction data to an image file. A method of attaching dust correction data to the image file of a moving image will be described.

First, MP4 will be explained. The MP4 is a moving image file format used to record moving image data in recent digital cameras, digital video cameras, and the like.

The MP4 file format (see ISO/IEC 14496-14; "Information technology—Coding of audio-visual objects—Part 14: MP4 file format"; ISO/IEC; 2003-11-24) is extended from a general-purpose file format "ISO Base Media File Format" (see ISO/IEC 14496-12; "Information technology—Coding of audio-visual objects—Part 12: ISO base media file format"; ISO/IEC; 2004-01-23). The MP4 file format is aimed at recording files of moving image/audio content data such as MPEG data standardized by ISO/IEC JTC1/SC29/WG11 (International Organization for Standardization/International Engineering Consortium). The present invention is applicable not only to MP4 but also to other similar file formats. For example, ISO has established standards "Motion JPEG 2000 file format" (ISO/IEC 15444-3) and "AVC file format" (ISO/IEC 14496-15) as file format standards having the same basic structure as that of MP4.

Figure 12:
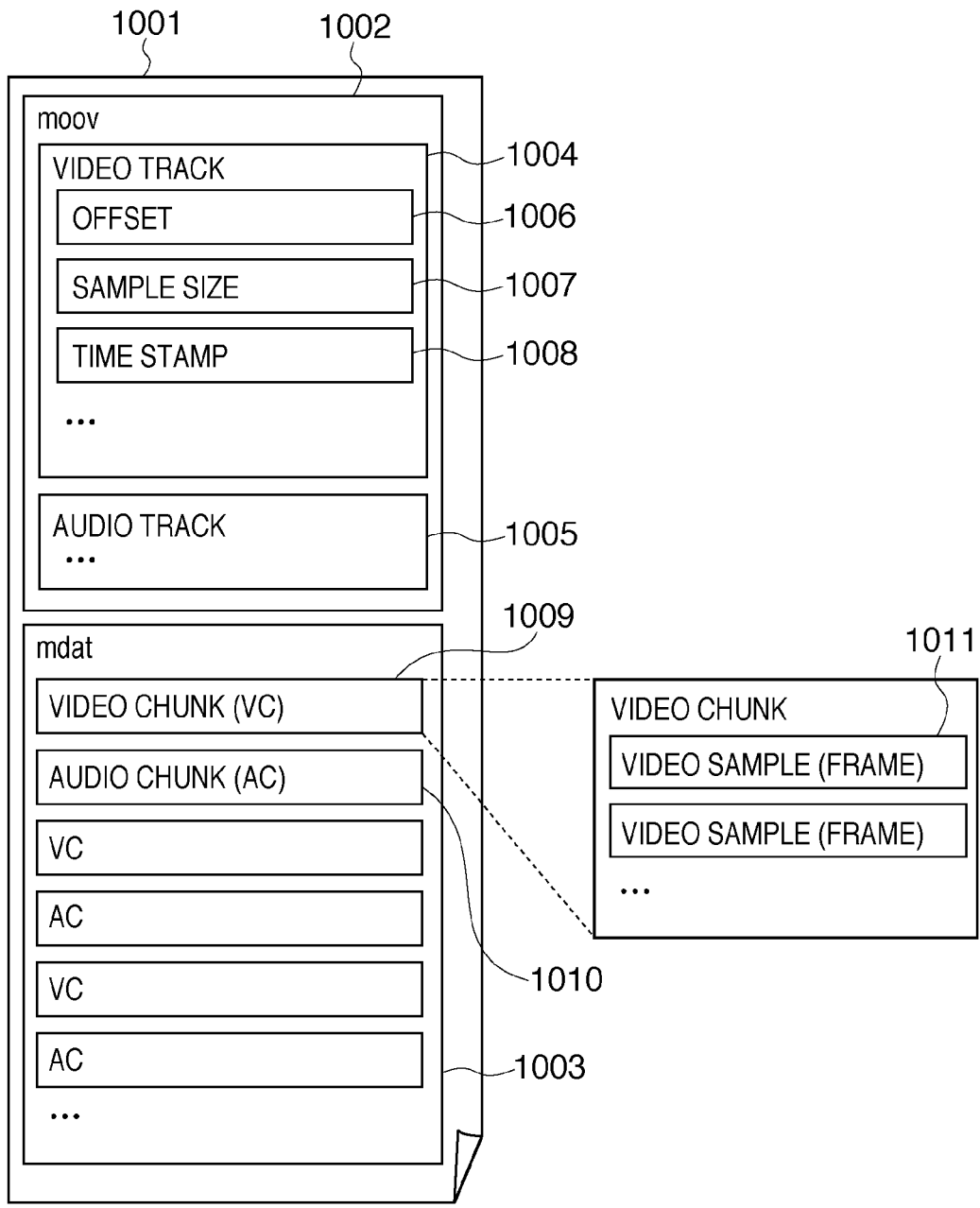
FIG. 12 is a view for explaining the concept of metadata and media data in an MP4 or similar file format.

FIG. 12 is a conceptual view for explaining the data structure of the MP4 file format.

An MP4 file 1001 contains metadata (header information) 1002 representing the physical position, temporal position, and characteristic information of video and audio data, and media data 1003 representing the entities of encoded video and audio data. According to the MP4 format, a presentation of all content is called a "movie", and that of a media stream which forms the content is called a "track". The metadata 1002 typically contains a video track 1004 for logically handling entire moving image data, and an audio track 1005 for logically handling entire audio data. The video track 1004 and audio track 1005 have almost the same configuration content. More specifically, respective tracks record various types of metadata information of actual media data. The respective content is slightly different in accordance with the characteristic of media data.

Data contained in the video track 1004 includes, for example, configuration information of a so-called decoder for decoding encoded data, and information on the rectangular size of a moving image. In addition, the data include an offset 1006 representing a position in a file where media data is actually recorded, a sample size 1007 representing the size of each frame data (also called a picture) of media data, and a time stamp 1008 representing the decoding time of each frame data.

The media data 1003 records the entities of moving image data and audio data in a data structure "chunk" which successively records one or more "samples" representing the basic unit of encoded data. The chunk includes a video chunk 1009 containing media data of a moving image, and an audio chunk 1010 containing media data of audio data in accordance with the track of the metadata 1002.

In the structure shown in FIG. 12, the video chunk 1009 and audio chunk 1010 are alternately recorded (interleaved), but the recording positions and order are not limited to those shown in FIG. 12. The recording positions and order shown in FIG. 12 are merely an example of a general recording format. However, this interleave arrangement can improve the accessibility of data recorded in a file because moving image data and audio data to be played back almost simultaneously are arranged at close positions. Thus, the interleave arrangement is very popular.

The chuck contains one or more samples of each media data. For example, as shown in FIG. 12, the video chunk 1009 successively records video samples (frames) 1011. In general, each video sample (frame) 1011 corresponds to one frame data (picture) of video data. Each track and each chuck are associated as follows.

For example, for moving image data, information contained in the video track 1004 includes information on each video chunk 1009 contained in the media data 1003. The offset 1006 is formed from a table of information representing the relative position of the video chunk 1009 in a corresponding file. By looking up each entry of the table, the position of an actual video chunk can be specified regardless of where the video chunk is recorded. The sample size 1007 describes, in a table, the sizes of respective samples, that is, video frames contained in a plurality of chunks.

More specifically, the video track 1004 also describes information regarding the number of samples contained in each chunk. From this information, samples in each video chunk 1009 can be acquired accurately. The time stamp 1008 records the decoding time of each sample in a table as the difference between samples. By looking up the table, a so-called time stamp of each sample can be acquired by calculating the accumulated time.

The relationship between the track and the chunk is defined so that it is established similarly between even the audio track 1005 and the audio chunk 1010. In the MP4 file format and ISO Base Media File Format, the metadata 1002 and media data 1003 can provide encoded data in a necessary unit from an arbitrary position together with additional information such as the time stamp. Note that not all items of standardized recording information have been described for descriptive convenience. Details of the definition content of the standard can be acquired from the corresponding sections of ISO/IEC 14496.

In the MP4 file format, data recorded in a file is described in a data structure "BOX". Data of each BOX is recorded in a file. The BOX is formed from the following fields:

Size: the size of the entire BOX including the size field itself.

Type: a 4-byte type identifier representing the type of the BOX. In general, the type identifier is made up of four alphanumeric characters.

Other fields are options depending on the specific BOX instance, so a description thereof will be omitted.

Data recorded in a file is held in a different type of BOX in accordance with the type of data. For example, the media data 1003 is recorded as Media Data BOX (the type field='mdat': When an identifier representing a BOX type is used in the following description, it expresses a BOX of this type). The metadata 1002 is recorded as a Movie BOX 'moov' which stores metadata information of all content. Information regarding the above-described chunk and sample is also recorded as a BOX having a unique identifier in moov for each track.

For a still image, dust correction data is written in the Exif field which is the header field of an image file. For a moving image, dust correction data is similarly written in the header field moov of an image file. The dust correction data can therefore be recorded in association with image data.

It is also possible to record dust correction data as an independent file and record only link information to the dust correction data file in an image file, thereby associating the dust correction data and image file. However, for the same reason as that for a still image, dust correction data is preferably held together with an image file.

Dust removal processing for a moving image can be achieved by executing the dust removal processing (FIGS. 7, 8, and 9) for a still image similarly for an image of every frame of the moving image using dust correction data associated with an image file.

Next, dust removal processing executed when moving image data containing dust correction data in the foregoing way is moved from the camera to an external image processing apparatus will be explained.

Figure 13:
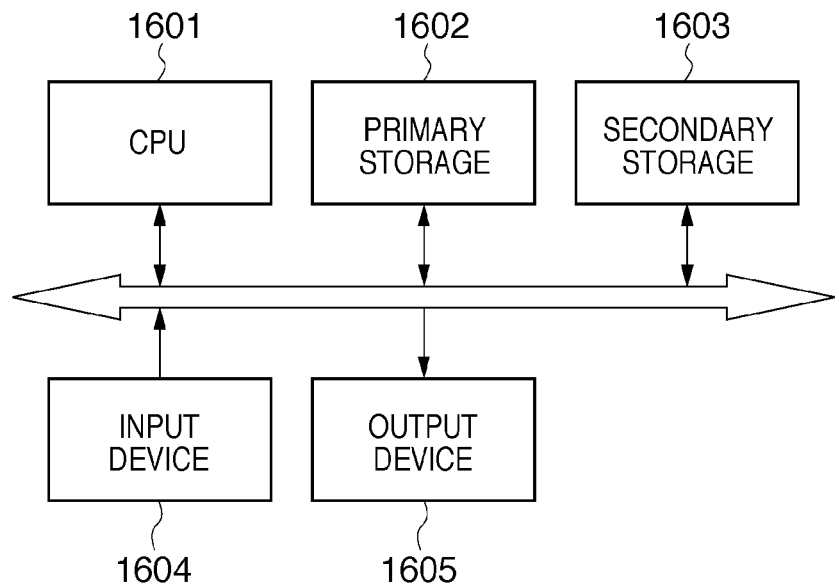
FIG. 13 is a block diagram showing the schematic system configuration of an image processing apparatus.

FIG. 13 is a block diagram showing the schematic system configuration of the image processing apparatus.

A CPU 1601 controls the overall system, and executes a program stored in a primary storage 1602. The primary storage 1602 is mainly a memory. The primary storage 1602 loads a program from a secondary storage 1603, and stores it. The secondary storage 1603 is, for example, a hard disk. In general, the primary storage is smaller in capacity than the secondary storage. The secondary storage stores programs, data, and the like which cannot be completely stored in the primary storage. The secondary storage also stores data which must be stored for a long time. In the embodiment, the secondary storage 1603 stores programs. When executing a program, it is loaded to the primary storage 1602 and executed by the CPU 1601. An input device 1604 includes a mouse and keyboard used to control the system, and a card reader, scanner, and film scanner necessary to input image data. An output device 1605 is, for example, a monitor or printer. The apparatus can take other various arrangements, but this is not a gist of the present invention and a description thereof will be omitted.

The image processing apparatus incorporates an operating system capable of parallel-executing a plurality of programs. The user can use a GUI (Graphical User Interface) to operate a program running on the apparatus.

Figure 14:
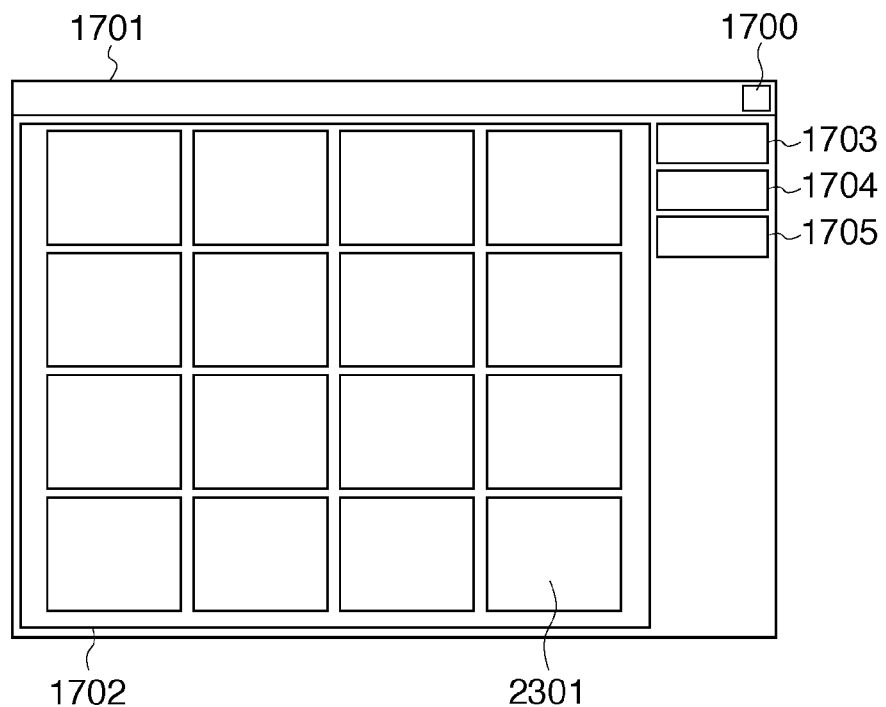
FIG. 14 is a view exemplifying a GUI in the image processing apparatus.

FIG. 14 is a view showing the GUI of an image editing program in the image processing apparatus. The window has a close button 1700 and title bar 1701. The user ends the program by pressing the close button. The user designates a moving image file to be corrected by dragging and dropping it to an image display area 1702. In response to this, the title bar 1701 displays the file name. After the user designates the image file to be corrected, the image display area 1702 displays frame images divided by an arbitrary time unit in a thumbnail form as represented by reference numeral 2301. The user presses an execution button 1703 to execute dust removal processing (to be described later) The image display area 1702 displays the images of processed frames in a form as represented by reference numeral 2301. The user presses a playback button 1704 to play back a moving image from which the shadow of dust has been removed by executing the dust removal processing, while displaying the moving image to fit in the image display area 1702. The user presses a save button 1705 to replace a target frame with the processed one and save the resultant image file.

Figure 17:
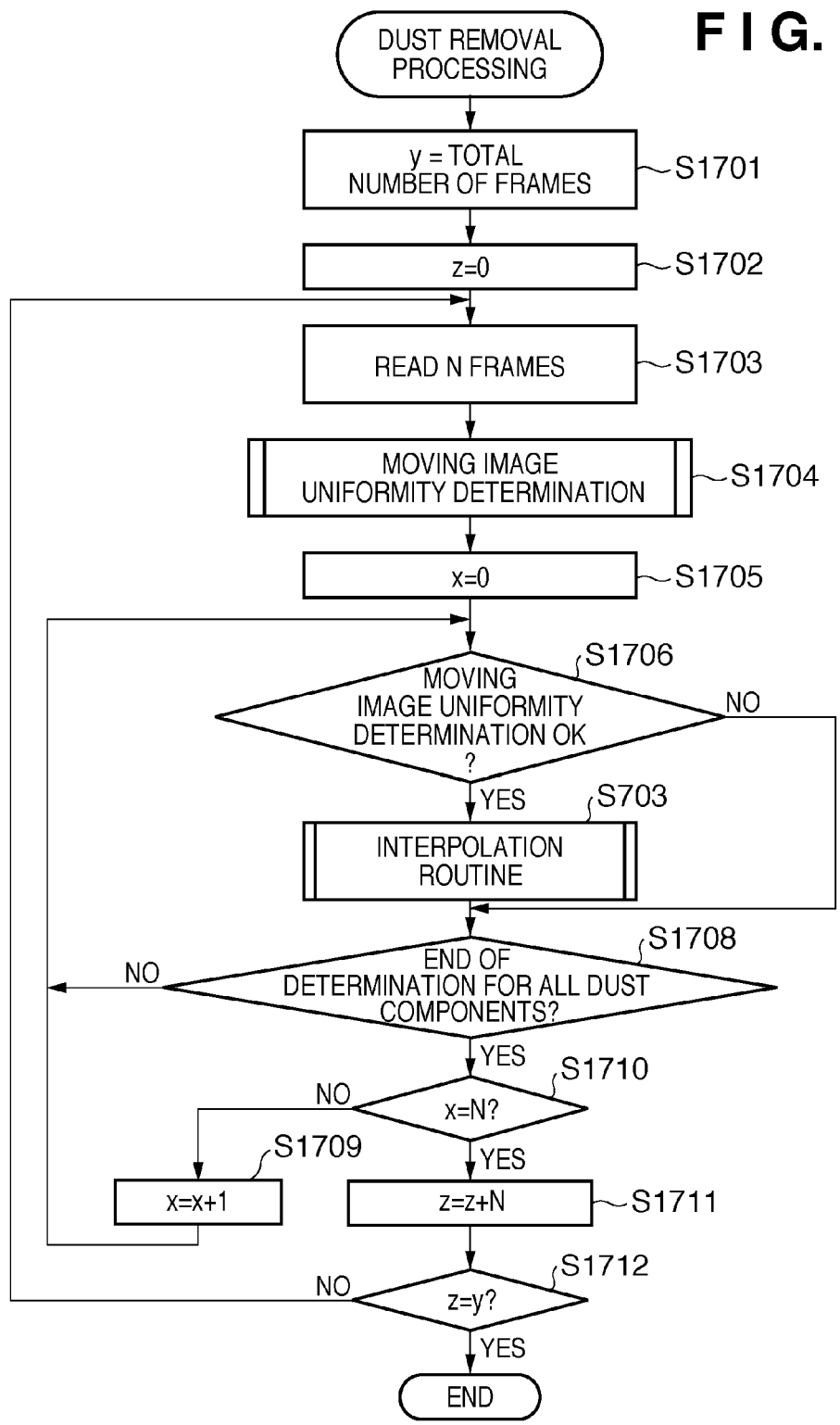
FIG. 17 is a flowchart showing the sequence of dust removal processing for a moving image in the first embodiment of the present invention.

FIG. 17 is a flowchart showing dust removal processing which is image processing in the first embodiment. This processing eliminates the influence of dust on image data of all frames in step S603 of FIG. 7 based on dust information extracted from the image file of a moving image. The CPU 1601 performs the dust removal processing operation (FIG. 7) including this processing by executing a dust removal processing program stored in the secondary storage 1603. Only the dust removal processing (FIG. 17) in the first embodiment will be explained. Dust information embedded in the image file of a moving image is assumed to be stored in the primary storage 1602 in step S602 of FIG. 7. In the embodiment, the moving image encoding method is arbitrary. The embodiment is applied to a decoded frame regardless of Motion JPEG or H.264 described above.

In step S1701, the number of frames included in the image file of a moving image is stored in y. In step S1702, z representing the number of currently processed frames is initialized to 0. Image data of N frames are read in step S1703, and the uniformity of the moving image in the image data is determined in step S1704. In this case, the CPU 1601 operates as a moving image uniformity determination unit. Details of this processing will be described later.

In the moving image uniformity determination (step S1704), the primary storage 1602 stores the uniformity determination results of the N frames for dust in a form as shown in FIG. 19. In step S1705, a target frame number x is initialized to 0. In step S1706, a moving image uniformity determination result for each dust region that is stored in the primary storage 1602 is read. If it is determined that correction is acceptable for dust corresponding to the target frame number, an interpolation routine in step S703 is executed to apply interpolation processing. If it is determined that correction is not acceptable for the dust, no interpolation routine is executed. In step S1708, it is checked whether the determination has ended for all dust components. If YES in step S1708, the process advances to step S1710. If NO in step S1708, the process returns to step S1706 to read a moving image uniformity determination result for the next dust. In this case, the CPU 1601 operates as a correction unit and control unit.

In step S1710, it is determined whether the processing has ended for all the read N frames. If YES in step S1710, the process advances to step S1711. If NO in step S1710, the current frame number x is incremented by one in step S1709.

Then, the process returns to step S1706 to read a moving image uniformity determination result for dust of the next frame.

In step S1711, z is added to the number N of read frames. In step S1712, it is determined whether z equals the total number y of frames included in the image file of the moving image. If z=y, the process ends. If z≠y, the process returns to step S1703 to read image data of the next N frames.

The dust removal processing for the image file of a moving image in the first embodiment has been described.

The moving image uniformity determination processing in step S1704 of FIG. 17 will be explained in detail.

Figure 18B:
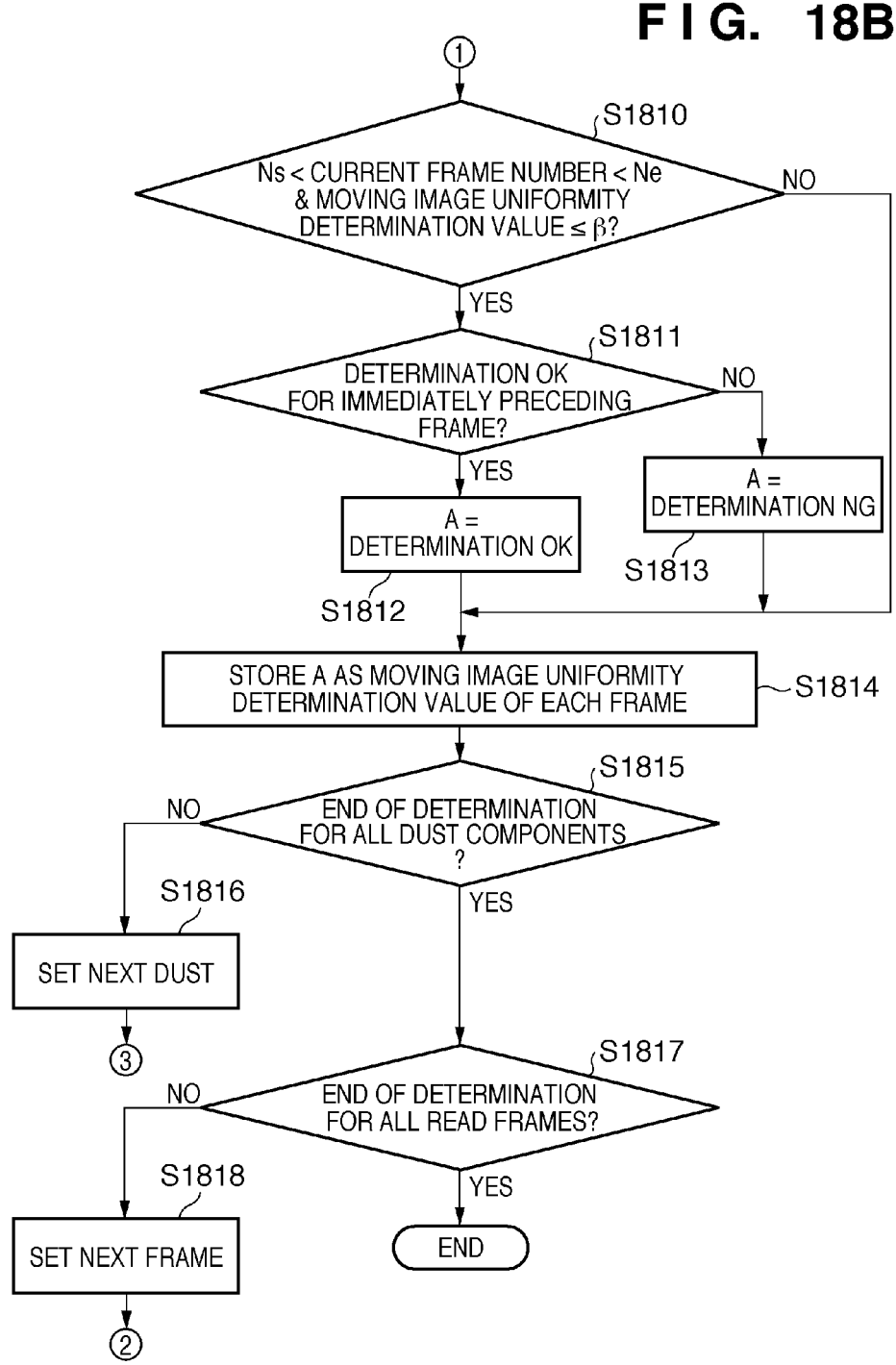

FIGS. 18A and 18B are flowcharts of the moving image uniformity determination processing in the first embodiment. The flowcharts of FIGS. 18A and 18B will be explained with reference to FIG. 15.

In step S1801, edge detection processing is performed for N read frames, that is, six frames in FIG. 15. This edge detection processing suffices to accurately detect a boundary. The embodiment does not have a feature in this processing method and adopts a known method. At this time, the CPU 1601 operates as a frame edge detection unit.

In step S1802, a frame in which the edge position and dust position overlap each other is extracted based on the edge position detected in step S1801 and dust information stored in the primary storage 1602. In FIG. 15, frames 2 and 5 in which ropes and dust overlap each other are extracted. In this case, the CPU 1601 operates as a foreign substance edge detection unit.

In step S1803, as the numbers of the frames extracted in step S1802, the number of a frame in which the edge and dust overlap each other for the first time is stored as Ns, and that of a frame in which the edge and dust overlap each other finally is stored as Ne. In FIG. 15, Ns=2 and Ne=5.

In step S1804, a time Tse[s] between Ns and Ne is obtained from Ns and Ne. When a moving image is stored at a frame rate F[fps], the time Tse[s] is given by $$Tse[s]=(Ne-Ns)/F$$

In FIG. 15, Tse=0.1 [s] for a frame rate of 30 [fps].

In step S1805, the primary storage 1602 stores the time Tse[s] obtained in step S1804 as a moving image uniformity determination value.

When the dust information contains items of dust position information, overlap with an edge position needs to be checked for each dust region position. Hence, a plurality of moving image uniformity determination values Tse, a plurality of frame numbers Ns, and a plurality of frame numbers Ne exist for each dust region as Tse(i), Ns(i), and Ne(i) (i=0, 1, 2, ..., n).

Processes in steps S1806 to S1818 are performed for each dust region in each read frame based on the dust region parameters Di and Ri (i=1, 2, ..., n) described in the dust information.

In step S1806, a still image uniformity determination value is calculated. This processing is the same as that executed in step S701 of FIG. 8.

In step S1807, the still image uniformity determination value is compared with the same value as the threshold α used for a still image in step S702 of FIG. 8. In this case, the CPU 1601 operates as a still image uniformity determination unit. The determination result in step S1807 is stored in A (steps S1808 and S1809).

In step S1810, it is determined whether the moving image uniformity determination value calculated in step S1805 is less than or equal to a threshold (determination criterion) β (less than or equal to the criterion value). If the moving image uniformity determination value is less than or equal to the threshold β, the process advances to S1811; if it is larger than the threshold β, to S1814. In this case, the CPU 1601 operates as a moving image correction determination unit.

The threshold β is the threshold of seconds for which an unnatural moving image is generated as a result of removal when the moving image having undergone dust removal processing is played back. When a moving image undergoes the same dust removal processing as that for a still image, dust disappears and appears as if it flickered, as shown in FIG. 16. To prevent this, the threshold β is set as seconds for which flickering stands out. It is determined that dust flickers if the moving image uniformity determination value is less than or equal to the threshold β. In the embodiment, the threshold β is set to 100 [ms].

If the current frame exists between frames in which dust in process overlaps an edge (Ns(i)<current frame<Ne(i)), and the moving image uniformity determination value Tse(i) is less than or equal to the threshold β in step S1810, the process advances to step S1811. To prevent flickering, the correction result of an immediately preceding frame for the same dust is acquired from moving image uniformity determination results (to be described later), and stored in A (steps S1812 and S1813). Needless to say, if the current frame is the start frame for which no immediately preceding frame exists, a still image uniformity determination result is used directly as a moving image uniformity determination result. If the moving image uniformity determination value Tse(i) is larger than the threshold β, the process advances to step S1814.

In step S1814, the primary storage 1602 stores the determination result of the current dust stored in A as a moving image uniformity determination result with a structure as shown in FIG. 19. As shown in FIG. 19, the moving image uniformity determination result holds a frame number, a dust number for uniquely identifying dust, and a correction result.

After the primary storage 1602 stores the moving image uniformity determination result, it is determined in step S1815 whether the determination processing has been executed for all dust components described in the dust information. If NO in step S1815, the process advances to step S1816 to set the next dust, and then returns to step S1806 to repeat the processing. If YES in step S1815, the process advances to step S1817 to determine whether the determination processing has ended for all the read frames. If NO in step S1817, the process advances to step S1818 to set the next frame. The process then returns to step S1806 to repeat the determination processing sequentially from the first dust in the dust information.

For example, in FIG. 15, the moving image uniformity determination value Tse is 0.1 [s] which is shorter than the threshold β(=100 [ms]). Hence, the result of an immediately preceding frame is used in step S1811 to prevent flickering. More specifically, the dust correction result of frame number 2 is not uniform in still image uniformity determination, so the result is determined as not acceptable for frame numbers 3 and 4. If the result of an immediately preceding frame is used, no correction is done for frame numbers 2 to 5 (correction is inhibited) (see FIG. 20). Note that the moving image uniformity determination threshold β is not limited to the above-mentioned value.

Dust removal processing using a separately prepared image processing apparatus has been described, but the dust removal processing may also be done within the digital camera body. When performing the dust removal processing in the digital camera body, the dust removal circuit 31 performs the same processes as those shown in the flowcharts of FIGS. 7, 17, and 18 by executing a dust removal processing program. For example, when the user designates the start of dust removal processing with the operation unit 70, the dust removal circuit 31 reads out the image file of a moving image stored in the memory 30. The dust removal circuit 31 performs the processes shown in FIGS. 7, 17, and 18, interpolating the shadow of dust in the moving image. Finally, the recording medium 200 records the interpolation processing result as a new moving image file.

As described above, dust removal processing is executed for a moving image as shown in FIG. 15 to prevent the moving image from becoming unnatural due to dust which appears and disappears within a short time as if it flickered as shown in FIG. 16. A moving image can undergo more proper dust removal processing, suppressing the influence of dust on the moving image.

(Second Embodiment)

The first embodiment does not perform interpolation processing for frames in which dust flickers, in order to prevent dust from disappearing and appearing between frames as if it flickered. The second embodiment will describe a moving image uniformity determination unit which is based on a viewpoint different from that for a still image, that is, one which takes into greater consideration the features of a moving image.

The foregoing still image uniformity determination unit is applied to a still image when a region containing designated dust has a complicated pattern. This is because, if such a region is interpolated, the interpolation result may become unnatural. Examples of the complicated pattern are a lawn, a carpet, and the design of a wall.

A still image requires the determination unit because of the still image viewing method. Many applications used to view a still image have a function of enlarging/reducing and displaying a still image, in addition to a variety of image processing functions. With an application, the user can perform various image processes for a still image, enlarge and display it, and carefully check the image. The shadow of dust in a region containing a complicated pattern prone to produce an unnatural correction result is not interpolated because unnaturalness stands out upon enlargement display.

In contrast, even if dust removal processing is performed for each frame of a moving image, the user rarely enlarges each frame for a careful examination. The user prefers a dust shadow-free moving image in playback.

For example, in FIG. 21, all the shadows of dust are corrected in the image file of the moving image in FIG. 15. A larger number of frames are corrected compared to those in FIGS. 16 and 20. In FIG. 21, frames 2, 3, and 5 undergo interpolation processing against dust overlapping a rope. This results in an unnatural image in which the rope is disconnected. However, each of frames 2, 3, and 5 is merely one frame of a moving image. For example, when the frame rate is 30 [fps], the frame is updated about every 33 [ms], and the user is not generally able to accurately observe the details of a single frame.

In other words, even if all the shadows of dust are corrected and independent frames become unnatural, like FIG. 21, the user does not notice the unnaturalness caused by correction of every frame when he sees the frames of the moving image successively. The user senses that a dust shadow-free moving image is natural.

In view of this, the second embodiment will describe moving image uniformity determination processing considering the moving image viewing method.

Figure 22:
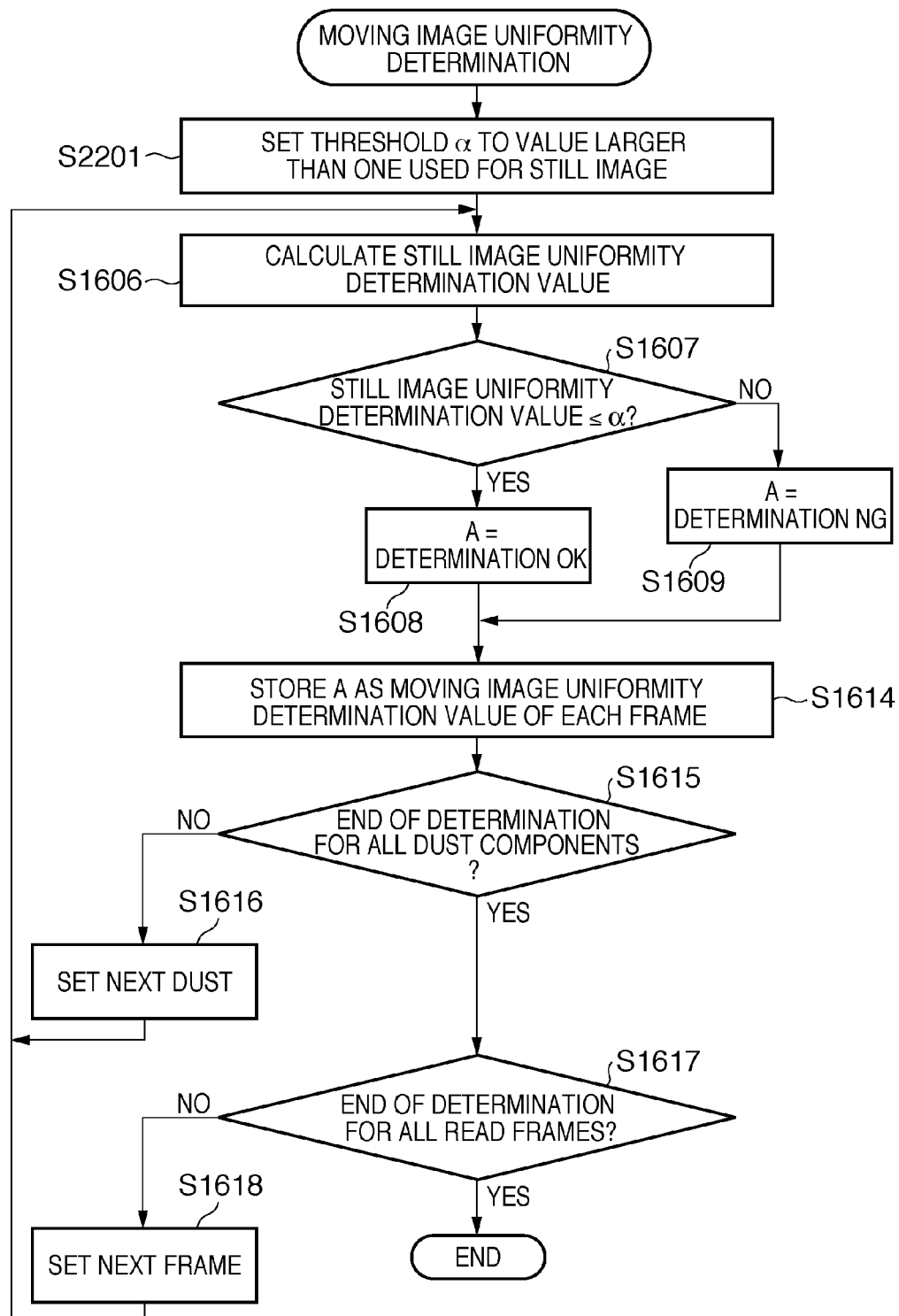
FIG. 22 is a flowchart showing the sequence of moving image uniformity determination processing in step S1704 of FIG. 17 in the second embodiment.

FIG. 22 is a flowchart showing the sequence of the moving image uniformity determination processing in the second embodiment. Only a difference from FIGS. 18A and 18B will be explained.

In step S2201, the correction target is the image file of a moving image. Thus, the threshold $\alpha$ of the still image uniformity determination value is set larger than one used in dust removal processing for a still image. As described above, the threshold $\alpha$ is used to determine whether a dust shadow-containing region is uniform. By increasing the threshold $\alpha$, it can be determined that even a slightly complicated region is uniform. For example, $\alpha$ is set to 18 in this case though it is 6 in the above-described processing.

In step S1806 and subsequent steps, the same processes as those in FIGS. 18A and 18B are performed to correct an even more complicated region than that in the dust removal processing for a still image.

As described above, when a moving image undergoes this processing, each corrected frame of the moving image, like a still image, seems unnatural singly. However, when the user sees the frames of the moving image successively, he does not sense any unnaturalness. The dust removal processing can create a dust shadow-free moving image more preferable for the user.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-244940, filed Sep. 24, 2008 which is hereby incorporated by reference herein in its entirety.

What is claimed is:

1. An image processing apparatus which corrects input image data based on the image data and foreign substance information containing information on a position and size of a foreign substance adhering to an optical element arranged in front of an image sensor in an image capturing apparatus that captures the image data, the apparatus comprising:

a correction unit which corrects the image data so as to reduce influence of a shadow of the foreign substance contained in the image data, based on the image data and the foreign substance information;

a still image uniformity determination unit which determines uniformity of an image in a region around the foreign substance in the image data, said still image uniformity determination unit being applied when input image data is a still image;

a moving image uniformity determination unit which determines the uniformity of the image in the region around the foreign substance in the image data based on a determination criterion different from a determination criterion applied to a still image by said still image uniformity determination unit, said moving image uniformity determination unit being applied when input image data is a moving image; and a control unit which inhibits correction of the image data by said correction unit when either of said still image uniformity determination unit and said moving image uniformity determination unit determines that the uniformity is not larger than a predetermined value; wherein said moving image uniformity determination unit comprises:

an edge detection unit which performs edge detection for a frame forming a moving image, a foreign substance edge detection unit which detects a frame in which an edge detected by said edge detection unit and a foreign substance image overlap each other, and a moving image correction determination unit which determines, based on the number of frames which are detected by said foreign substance edge detection unit and in which the foreign substance image and the edge overlap each other, whether to correct the foreign substance image contained in data of the moving image.

2. The apparatus according to claim 1, wherein said moving image uniformity determination unit uses, as the determination criterion for determining uniformity, a criterion for determining that even a complicated image in the region around the foreign substance is uniform, unlike the determination criterion used in said still image uniformity determination unit.

3. A method of controlling an image processing apparatus which corrects input image data, based on the image data and foreign substance information containing information on a position and size of a foreign substance adhering to an optical element arranged in front of an image sensor in an image capturing apparatus that captures the image data, the method comprising:

a correction step of correcting the image data so as to reduce influence of a shadow of the foreign substance contained in the image data, based on the image data and the foreign substance information;

a still image uniformity determination step of determining uniformity of an image in a region around the foreign substance in the image data, the still image uniformity determination step being applied when input image data is a still image;

a moving image uniformity determination step of determining the uniformity of the image in the region around the foreign substance in the image data based on a determination criterion different from a determination criterion applied to a still image in the still image uniformity determination step, the moving image uniformity determination step being applied when input image data is a moving image; and a control step of inhibiting correction of the image data in the correction step when uniformity is determined in either of the still image uniformity determination step and the moving image uniformity determination step to be not larger than a predetermined value, wherein said moving image uniformity determination step comprises:

an edge detection step of performing edge detection for a frame forming a moving image, a foreign substance edge detection step of detecting a frame in which an edge detected by said edge detection step and a foreign substance image overlap each other, and a moving image correction determination step which determines, based on the number of frames which are detected in said foreign substance edge detection step and in which the foreign substance image and the edge overlap each other, whether to correct the foreign substance image contained in data of the moving image.

4. A non-transitory computer-readable medium storing a program for causing a computer to execute a method of controlling an image processing apparatus which corrects input image data, based on the image data and foreign substance information containing information on a position and size of a foreign substance adhering to an optical element arranged in front of an image sensor in an image capturing apparatus that captures the image data, the method comprising:

a correction step of correcting the image data so as to reduce influence of a shadow of the foreign substance contained in the image data, based on the image data and the foreign substance information;

a still image uniformity determination step of determining uniformity of an image in a region around the foreign substance in the image data, the still image uniformity determination step being applied when input image data is a still image;

a moving image uniformity determination step of determining the uniformity of the image in the region around the foreign substance in the image data based on a determination criterion different from a determination criterion applied to a still image in the still image uniformity determination step, the moving image uniformity determination step being applied when input image data is a moving image; and a control step of inhibiting correction of the image data in the correction step when uniformity is determined in either of the still image uniformity determination step and the moving image uniformity determination step to be not larger than a predetermined value, wherein said moving image uniformity determination step comprises:

an edge detection step of performing edge detection for a frame forming a moving image, a foreign substance edge detection step of detecting a frame in which an edge detected by said edge detection step and a foreign substance image overlap each other, and a moving image correction determination step which determines, based on the number of frames which are detected in said foreign substance edge detection step and in which the foreign substance image and the edge overlap each other, whether to correct the foreign substance image contained in data of the moving image.

5. An image processing apparatus comprising:

a correction unit which corrects image data so as to reduce influence of a shadow of a foreign substance contained in the image data, based on the image data and the foreign substance information, wherein the foreign substance information containing information on a position and size of the foreign substance;

an edge detection unit which performs edge detection for a frame forming a moving image;

a frame detection unit which detects a frame in which an edge detected by the edge detection unit and a foreign substance image overlap with each other, and counts the number of frames in which the foreign substance image and the edge overlap with each other; and a moving image correction determination unit which determines whether to correct the foreign substance image contained in data of the moving image, based on the number of frames.

6. The image processing apparatus according to claim 5, wherein the moving image correction determination unit determines whether to correct the foreign substance image contained in data of the moving image, based on the time of frames that is obtained from the number of frames and a frame rate of the moving image.

7. A method of controlling an image processing apparatus which corrects image data, based on the image data and foreign substance information containing information on a position and size of a foreign substance, the method comprising:

an edge detection step of performing edge detection for a frame forming a moving image;

a frame detection step of detecting a frame in which an edge detected in the edge detection step and a foreign substance image overlap with each other, and counting the number of frames in which the foreign substance image and the edge overlap with each other; and a moving image correction determination step of determining whether to correct the foreign substance image contained in data of the moving image, based on the number of frames.

8. The method of controlling an image processing apparatus according to claim 7, wherein the moving image correction determination step determines whether to correct the foreign substance image contained in data of the moving image, based on the time of frames that is obtained from the number of frames and a frame rate of the moving image.

9. A non-transitory computer-readable medium storing a program for causing a computer to execute a method of controlling an image processing apparatus which corrects image data, based on the image data and foreign substance information containing information on a position and size of a foreign substance, the method comprising:

an edge detection step of performing edge detection for a frame forming a moving image;

a frame detection step of detecting a frame in which an edge detected in the edge detection step and a foreign substance image overlap with each other, and counting the number of frames in which the foreign substance image and the edge overlap with each other; and a moving image correction determination step of determining whether to correct the foreign substance image contained in data of the moving image, based on the number of frames and a frame rate of the moving image.

10. The non-transitory computer-readable medium according to claim 9, wherein the moving image correction determination step determines whether to correct the foreign substance image contained in data of the moving image, based on the time of frames that is obtained from the number of frames and a frame rate of the moving image.

* * * * *